United States Patent
Nakamura

(10) Patent No.: US 7,319,801 B2
(45) Date of Patent: Jan. 15, 2008

(54) OPTICAL TRANSMISSION SYSTEM AND DISPERSION COMPENSATION METHOD FOR OPTICAL TRANSMISSION SYSTEM AS WELL AS SIMULATION EQUIPMENTS

(75) Inventor: Kentaro Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/472,301

(22) Filed: Jun. 22, 2006

(65) Prior Publication Data

US 2007/0201790 A1 Aug. 30, 2007

(30) Foreign Application Priority Data

Feb. 24, 2006 (JP) .............................. 2006-048944

(51) Int. Cl.
*G02B 6/28* (2006.01)
(52) U.S. Cl. .......................................... 385/24; 385/15
(58) Field of Classification Search ................ 385/15, 385/24
See application file for complete search history.

(56) References Cited

U.S. PATENT DOCUMENTS

2005/0226629 A1  10/2005  Ooi et al. .................... 398/147

FOREIGN PATENT DOCUMENTS

JP   2005-295126   10/2005

OTHER PUBLICATIONS

Yann Frignac, et al., "Numerical Optimization of Pre- and In-Line Dispersion Compensation in Dispersion-Managed Systems at 40 Gbit/s", International Conference OFC 2002, Article No. ThFF5, pp. 612-613, Mar. 21, 2002.

*Primary Examiner*—Jennifer Doan
(74) *Attorney, Agent, or Firm*—Staas & Halsey LLP

(57) ABSTRACT

A chromatic dispersion compensation method is disclosed wherein setting of a dispersion compensation amount with which the quality of a signal to be reproduced at a receiver side is enhanced when compared with that of conventional equipments can be searched readily. In the method, the value to be set as the sum total of residual dispersion amounts remaining after dispersion compensation by a dispersion compensation section provided in each equipments or the sum total of absolute values of the residual dispersion amounts is calculated by arithmetically operating a linear function expression. Then, the dispersion compensation amount to be used in the dispersion compensation section in the equipments is determined based on the derived value to be set as the sum total of residual dispersion amounts or the sum total of absolute values of the residual dispersion amounts.

14 Claims, 33 Drawing Sheets

FIG. 6

| CONDITION | FIBER | INPUT POWER [dBm/ch] | SPAN NUMBER | SPAN LENGTH [km] | TOTAL DISTANCE [km] |
|---|---|---|---|---|---|
| (a) | E-LEAF | 0.8 | 6 | 50 | 300 |
| (b) | E-LEAF | 0.8 | 6 | 80 | 480 |
| (c) | E-LEAF | 2.5 | 6 | 80 | 480 |
| (d) | E-LEAF | 0.8 | 12 | 50 | 600 |
| (e) | E-LEAF | 0.8 | 12 | 80 | 960 |
| (f) | TWRS | 0.8 | 6 | 80 | 480 |
| (g) | TWRS | 2.5 | 6 | 80 | 480 |
| (h) | TWRS | 0.8 | 12 | 80 | 960 |

SHORT WAVELENGTH SIDE

CENTRAL WAVELENGTH

LONG WAVELENGTH SIDE

SHORT WAVELENGTH SIDE

CENTRAL WAVELENGTH

LONG WAVELENGTH SIDE

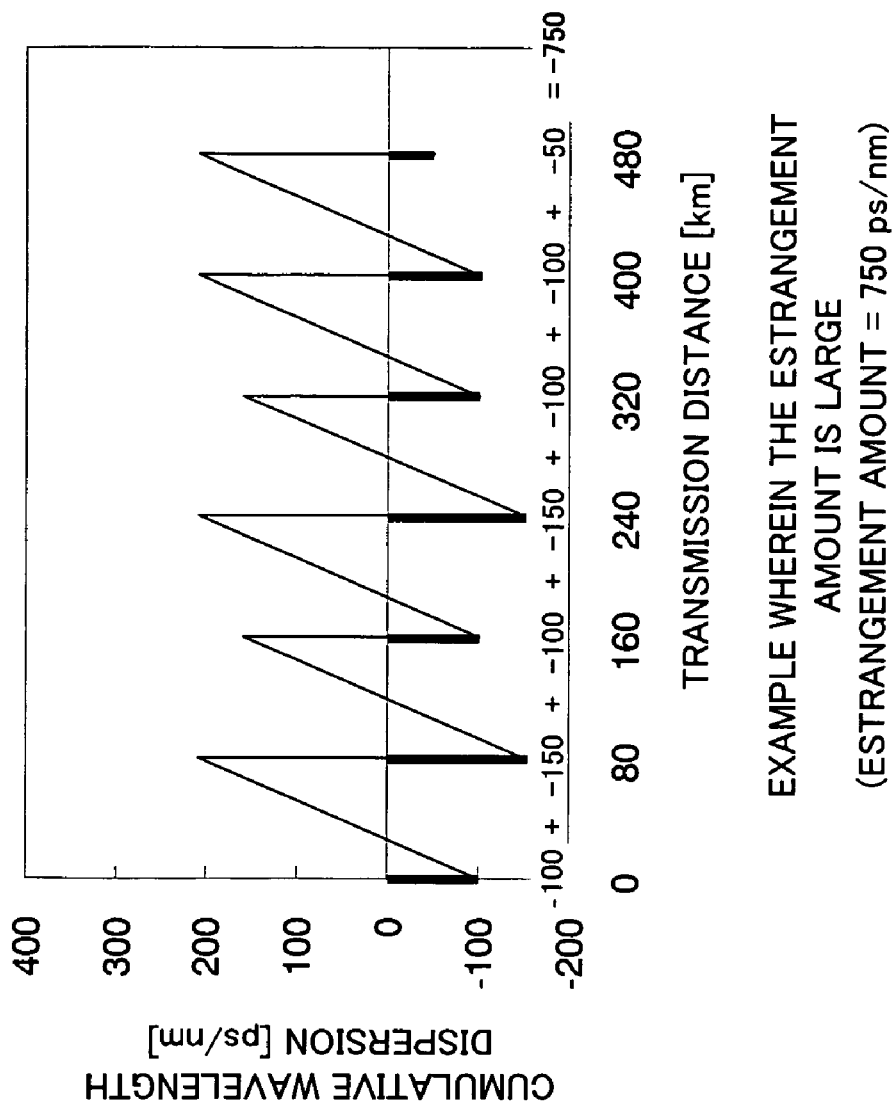

SHORT WAVELENGTH SIDE

CENTRAL WAVELENGTH

LONG WAVELENGTH SIDE

SHORT WAVELENGTH SIDE

CONVENTIONAL TECHNIQUE

CENTRAL WAVELENGTH

CONVENTIONAL TECHNIQUE

LONG WAVELENGTH SIDE

CONVENTIONAL TECHNIQUE

OPTICAL TRANSMISSION SYSTEM AND DISPERSION COMPENSATION METHOD FOR OPTICAL TRANSMISSION SYSTEM AS WELL AS SIMULATION EQUIPMENTS

BACKGROUND OF THE INVENTION

1) Field of the Invention

This invention relates to an optical transmission system, a dispersion compensation method for an optical transmission system and a simulation equipments suitable for use when dispersion compensation on an optical transmission line is performed.

2) Description of the Related Art

In recent years, development for practical use of an optical transmitter for increase of the capacity and the transmission distance of an optical transmission system is demanded. Particularly, there is growing expectation to introduce an optical transmitter which adopts an optical modulation method suitable for increase of the capacity and the transmission distance into an actual system. In order to satisfy the expectation, introduction of an optical transmission system for which a differential phase shift keying method such as DPSK (Differential Phase Shift Keying) or DQPSK (Differential Quadrature Phase Shift Keying) is used is anticipated.

Further, in an optical transmission system, a design for chromatic dispersion compensation is significant. Depending upon achromatic dispersion compensation method, there is the possibility that non-linear effect of light in an optical fiber may cause significant deterioration of the transmission quality. Particularly, in a 40 Gbit/s WDM (Wavelength Division Multiplexing) transmission system, since the withstanding property against chromatic dispersion is poor, it is necessary to perform appropriate dispersion compensation design.

It has been examined to design an NRZ (Non Return to Zero) modulation method which is one of conventional modulation methods such that the relationship between a pre-line dispersion compensation amount (dispersion compensation amount on the transmitter side) and an in-line dispersion compensation ratio (proportion of dispersion compensation amount for a chromatic dispersion of transmission line in each repeater) is kept at a constant value irrespective of the number of transmission spans, as disclosed, for example, in Yann Frignac and Jean-Christophe, "Numerical optimization of pre- and in-line dispersion compensation in dispersion-managed systems at 40 Gbit/s", International Conference OFC 2002, article No. ThFF5, held March, 2002, pp. 612-613 (hereinafter referred to as Non-Patent Document 1) or Japanese Patent Laid-Open No. 2005-295126 (hereinafter referred to as Patent Document 1).

However, in an optical transmission system to which a differential phase shift keying method such as DPSK or DQPSK is applied, even if a method of compensating for chromatic dispersion which has been applied to such an NRZ modulation method as described above is used, it is difficult to achieve sufficiently good quality of a signal to be reproduced at a receiver side. Accordingly, in the optical transmission system which adopts a differential phase shift keying method, it is required to perform setting of the pre-line dispersion compensation amount or the in-line dispersion compensation amount from a point of view different from that of the conventional technique.

In this regard, it is expected that setting of an optimum dispersion compensation amount is searched by randomly combining various variations regarding the pre-line dispersion compensation amount and the in-line dispersion compensation amount in each repeater to measure and evaluate the signal quality at a receiver side. However, such a searching method as just described gives a subject that much time is required for a process for specifying setting of an optimum dispersion compensation amount.

SUMMARY OF THE INVENTION

It is an object of the present invention to provide an optical transmission system, a dispersion compensation method and a simulation equipments wherein setting of a dispersion compensation amount with which the quality of a signal to be reproduced at a receiver side is enhanced when compared with that of conventional equipments can be searched readily.

In order to attain the object described above, according to an aspect of the present invention, there is provided a dispersion compensation method for an optical transmission system which includes a transmitter for transmitting an optical signal, a receiver for receiving the optical signal, and a transmission line for interconnecting the transmitter and the receiver through repeater and wherein a dispersion compensation section for compensating for a chromatic dispersion of the transmission line is provided in any of the transmitter, repeater and receiver, comprising the steps of determining the number of repeaters each for interconnecting adjacent ones of the equipments of the optical transmission system, calculating a value to be set as the sum total of residual dispersion amounts remaining after dispersion compensation by the dispersion compensation section in each equipments or as the sum total of absolute values of the residual dispersion amounts in response to the determined number of repeaters by arithmetically operating a linear function, and determining a dispersion compensation amount by the dispersion compensation section in each equipments based on the calculated value to be set as the sum total of residual dispersion amounts or as the sum total of absolute values of the residual dispersion amounts.

Preferably, the linear function expression is $y1=Ax+B$ or $y2=Ax+B$ where the variable x is a value calculated by multiplying the number of repeaters by a chromatic dispersion coefficient while A is a gradient and B is an intercept, and the sum total $y1$ of residual dispersion amounts remaining after the dispersion compensation by the dispersion compensation section in each equipments or the sum $y2$ of absolute values of the residual dispersion amounts is calculated using the linear function expression.

The sum total $y1$ of residual dispersion amounts for determining the dispersion compensation amount by the dispersion compensation section in each equipments may be calculated using a linear function expression wherein the gradient A and the intercept B in the linear function expression $y1=Ax+B$ are assumed as values same as values when the sum $y2$ of absolute values of the residual dispersion amounts is represented or as values obtained by inverting the polarities of the individual values.

The dispersion compensation method may be configured such that the transmitter transmits an optical signal modulated by differential phase shift keying, and, where the unit of the sum total $y1$ of residual dispersion amounts or the sum total $y2$ of absolute values of the residual dispersion amounts is ps/nm and the unit of the chromatic dispersion coefficient of the transmission line is ps/nm/km, the value of the gradient A in the linear function expression is set to 56 to 80 and the value of the intercept B is set to −170 to −70.

The gradient A and the intercept B of the linear function expression may be set in response to a modulation method for an optical signal to be outputted from the transmitter and a type of an optical fiber which forms the transmission line. Preferably, the transmitter transmits a WDM optical signal.

According to another aspect of the present invention, there is provided an optical transmission system comprising a transmitter for transmitting an optical signal, a receiver for receiving the optical signal, a transmission line for interconnecting the transmitter and the receiver through repeater, and a dispersion compensation section provided in any of the transmitter, repeater and receiver for compensating for a chromatic dispersion of the transmission line, a dispersion compensation amount by the dispersion compensation section in each equipments being determined such that the sum total of residual dispersion amounts remaining after dispersion compensation by the dispersion compensation section in each equipments or the sum total of absolute values of the residual dispersion amounts increases substantially in proportion to the number of repeaters each for interconnecting adjacent ones of the equipments on the transmission line.

According to a further aspect of the present invention, there is provided a simulation equipments for arithmetically operating a barometer value which is to be used, in an optical transmission system which includes a transmitter for transmitting an optical signal, a receiver for receiving the optical signal and a transmission line for interconnecting the transmitter and the receiver through repeater, as a barometer for setting a dispersion compensation amount in any of the transmitter, repeater and receiver, comprising a repeater number acquisition section for acquiring the number of repeaters each for interconnecting adjacent ones of the equipments of the optical transmission system, a transmission line dispersion coefficient acquisition section for acquiring a dispersion coefficient of the transmission line, a linear function arithmetic operation section for performing arithmetic operation of a linear function wherein the product of the number of repeaters acquired by the repeater number acquisition section and the dispersion coefficient acquired by the transmission line dispersion coefficient acquisition section is used as a variable to calculate, as the barometer value, the sum total of residual dispersion amounts remaining after dispersion compensation by the dispersion compensation section in each equipments or the sum total of absolute values of the residual dispersion amounts, and a parameter retaining section for retaining a gradient and an intercept of the linear function to be used in the arithmetic operation by the linear function arithmetic operation section as parameter information.

With the dispersion compensation method for an optical transmission system, the optical transmission system and the simulation equipments, a value to be set as the sum total of residual dispersion amounts remaining after the dispersion compensation by the dispersion compensation section in the transmitter, repeater or receiver or the sum total of absolute values of the residual dispersion amounts is calculated by arithmetically operating a linear function expression, and the dispersion compensation amount in the dispersion compensation section in any of the equipments can be determined based on the derived value to be set as the derived sum total of residual dispersion amounts or the sum total of absolute values of the residual dispersion amounts. Therefore, there is an advantage that the sum total of residual dispersion amounts or the absolute value sum with which good received signal quality can be obtained can be calculated by simple arithmetic operation. Further, if the sum total or the sum total of absolute values is used in searching of setting of a dispersion compensation amount, then influential orientation for obtaining setting for achieving good received signal quality can be obtained. Therefore, there is another advantage that, when compared with an alternative case wherein measurement and evaluation of received signal quality based on random setting of a dispersion compensation amount are performed, the load to development of an optical transmission system can decreased significantly.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 6 is a view illustrating setting conditions of the optical transmission system wherein the received signal quality is measured and evaluated;

FIGS. 19 and 20 are diagrams each illustrating a simple sum total (second estrangement amount) of residual dispersion amounts in a modification to the first embodiment of the present invention;

DESCRIPTION OF THE PREFERRED EMBODIMENTS

In the following, embodiments of the present invention are described with reference to the drawings.

[a] Description of First Embodiment

[a-1] Optical Transmission System 1

Figure 1:
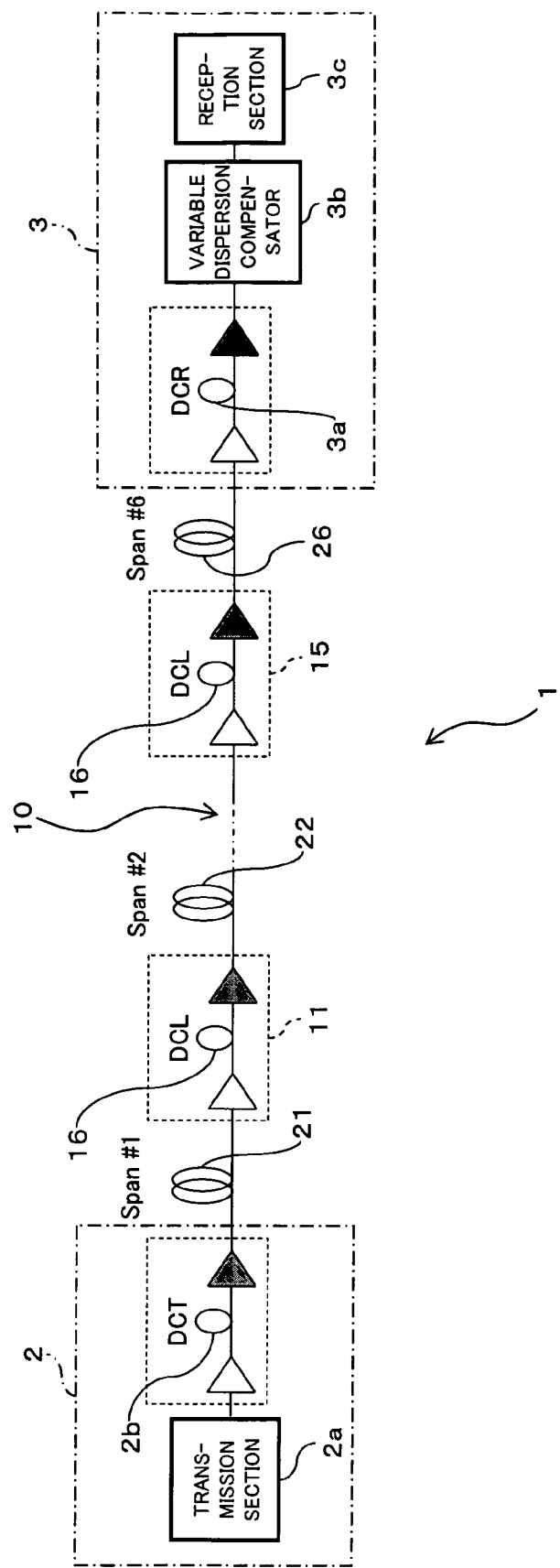
FIG. 1 is a diagrammatic view showing an optical transmission system according to a first embodiment of the present invention.

FIG. 1 shows an optical transmission system 1 according to a first embodiment of the present invention. Referring to FIG. 1, the optical transmission system 1 shown includes a transmitter 2 which transmits an optical signal, a receiver 3 which receives the optical signal, and a transmission line 10 for connecting the transmitter 2 and the receiver 3 to each other through repeater 11 to 15. Further, dispersion compensation sections 2b, 16, and 3a for compensating for a chromatic dispersion on the transmission line 10 are provided in the transmitter 2, repeater 11 to 15 and receiver 3, respectively.

In particular, the transmitter 2 includes a transmitter section 2a for outputting an optical signal for which differential phase shift keying such as, for example, DQPSK or the like is performed and a transmitter side dispersion compensation section (DCT) 2b for performing pre-dispersion compensation for an optical signal outputted from the transmitter section 2a. The optical signal for which the pre-dispersion compensation is performed by the transmitter side dispersion compensation section 2b is transmitted to the receiver 3 through the transmission line 10.

The transmission line 10 includes, for example, as shown in FIG. 1, transmission line fibers 21 to 26 and five repeater (ILA: In Line Amplifiers) 11 to 15 for repeating and connecting the transmission line fibers 21 to 26 to each other. In particular, the transmission line fibers 21 to 26 connect repeaters which form the transmission line 10. It is to be noted that, in FIG. 1, the transmission line fiber 21 of span #1 in which the transmitter 2 and the repeater 11 are connected to each other by fifer connection, the transmission line fiber 22 of span #2 between the repeater 11 and 12, and the transmission line fiber 26 of span #6 between the repeater 15 and the receiver 3 are particularly shown, but the repeater 12 to 14 and the transmission line fiber 23 to 25 are not shown in FIG. 1.

Each of the repeater 11 to 15 includes a repeating stage dispersion compensation section (DCL) 16 for compensating for a chromatic dispersion regarding an optical signal inputted from an upstream side one of the optical fibers 21 to 24.

The receiver 3 receives an optical signal from the transmitter 2 as an input thereto through the transmission line 10 and performs a received signal process, and includes a receiver side dispersion compensation section (DCR) 3a for performing dispersion compensation for an optical signal from the transmission line fiber 26, a variable dispersion compensator 3b capable of variably adjusting the dispersion compensation amount, and a receiver section 3c for performing a differential phase shift keying demodulation process and so forth for an optical signal for which the dispersion compensation is performed to reproduce a received signal.

It is to be noted that, as shown in FIG. 1, an amplifier for amplifying an optical signal can be provided suitably in the transmitter side dispersion compensation section 2b, repeater 11 to 15 and receiver side dispersion compensation section 3a.

The dispersion compensation amount in each of the dispersion compensation section 2b, 16 and 3a provided in the transmitter 2, repeater 11 to 15 and receiver 3 described above, respectively, can be determined based on an estrangement amount calculated as described below.

[a-2] Estrangement Amount

In the first embodiment, the sum total of absolute values of residual dispersion amounts remaining after the dispersion compensation by any of the dispersion compensation sections 2b, 16 and 3a in the transmitter 2, repeater 11 to 15 and receiver 3 is determined as an estrangement amount (first estrangement amount). Then, based on the estrangement amount, a dispersion compensation amount with which good received signal quality in the optical transmission system 1 can be achieved is set.

Figure 2:
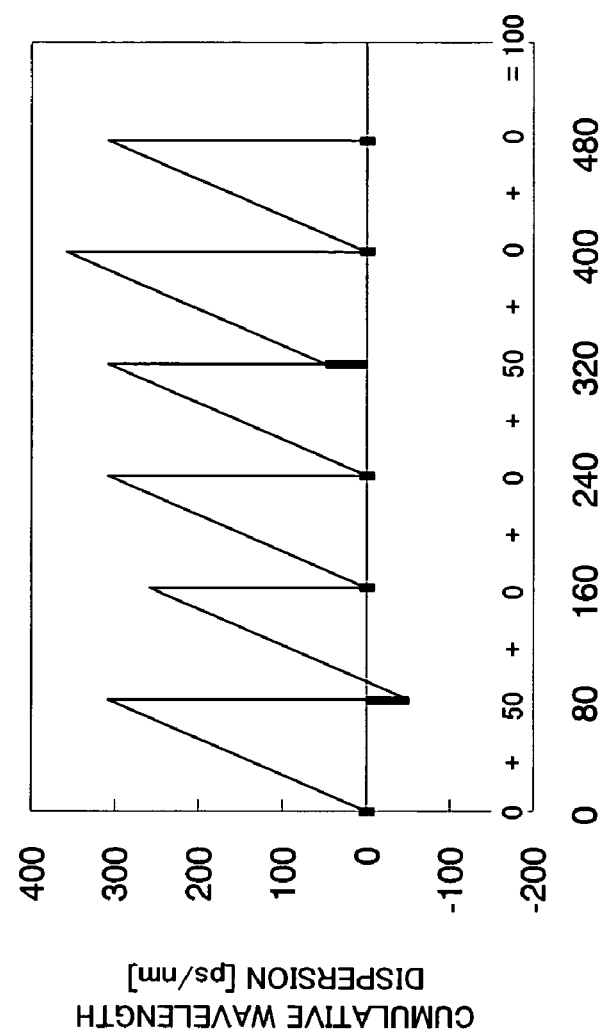
FIGS. 2 and 3 are diagrams each illustrating a sum total (first estrangement amount) of absolute values of residual dispersion amounts in the first embodiment of the present invention.
Figure 3:
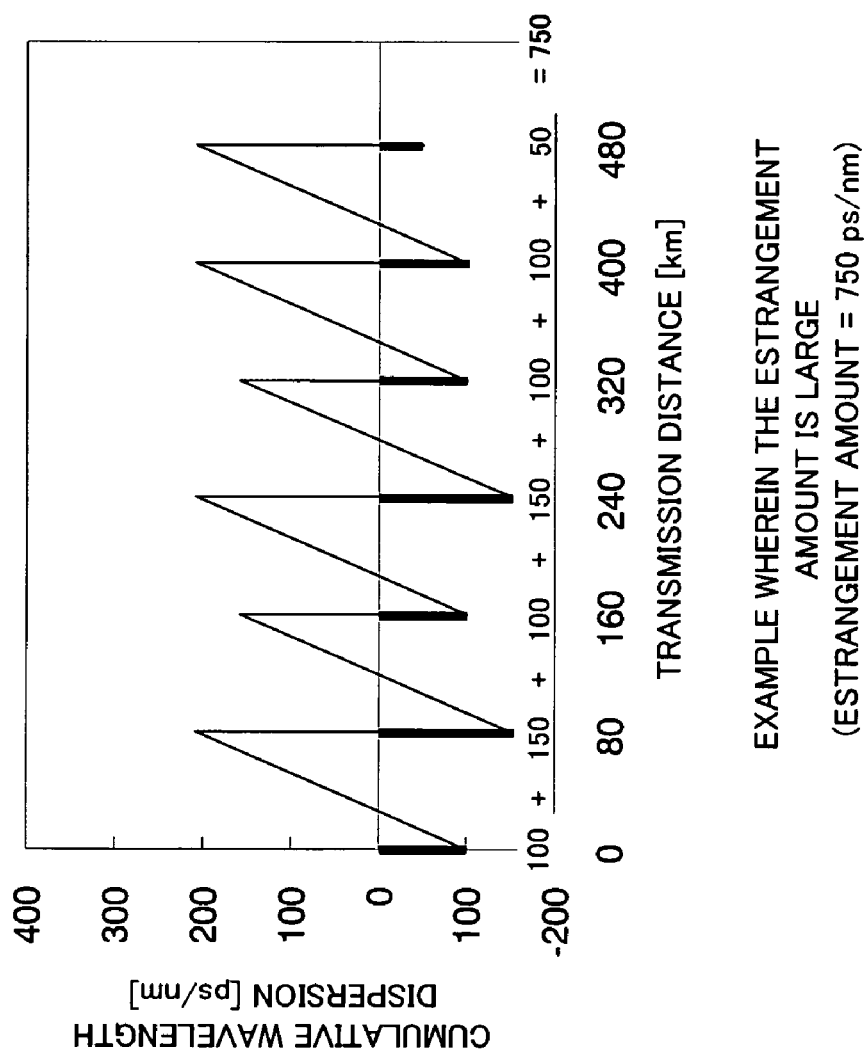

For example, where the residual dispersion amount after the dispersion compensation by the dispersion compensation sections 2b, 16 and 3a in the transmitter 2, repeater 11 to 15 and receiver 3 is 0, −50, 0, 0, +50, 0, 0 in a unit of ps/nm as seen in FIG. 2, the estrangement amount is 100 ps/nm which is the sum total of absolute values of the values given above. Further, where the residual dispersion amount corresponding to FIG. 2 is −100, −150, −100, −150, −100, −100, −50 as seen in FIG. 3, the estrangement amount is 750 ps/nm which is the sum total of absolute values of the values given above.

[a-3] Calculation of Optimum Estrangement Amount

In the first embodiment, when a dispersion compensation amount in the transmitter 2, repeater 11 to 15 and receiver 3 is to be set, an estrangement amount with which good received signal quality can be obtained can be calculated based on a linear function expression given hereinbelow as an expression (1) wherein the value of the number of spans of the transmission line 10× a transmission line dispersion coefficient is used as a variable. In particular, based on the estrangement amount calculated, allocation setting of a dispersion compensation amount in the dispersion compensation sections 2b, 16 and 3a in the transmitter 2, repeater 11 to 15 and receiver 3 can be performed.

In other words, allocation of a dispersion compensation amount in the dispersion compensation sections 2b, 16 and 3a is searched using the estrangement amount calculated in accordance with the expression (1) as a barometer value, that is, so that the estrangement amount becomes equal to a calculated value. Consequently, when compared with an alternative case wherein measurement and evaluation of received signal quality is performed based on random setting of a dispersion compensation amount, the searching process described above makes effective orientation in searching for setting of a dispersion compensation amount with which good received signal quality can be obtained. Therefore, the load to system development can be decreased significantly.

Further, if allocation of a dispersion compensation amount is performed based on the calculated estrangement amount, then the received signal quality according to a variation of allocation of a dispersion compensation amount is better in average than that in any other case wherein allocation of a dispersion compensation amount is performed based on another estrangement amount as hereinafter described. Consequently, allocation setting of a dispersion compensation amount in the dispersion compensation sections 2b, 16 and 3a is facilitated.

The inventor of the present invention has measured and evaluated the received signal quality with respect to the estrangement amount under the condition that the optical transmission power, the number of repeaters (number of spans), an optical wavelength and the dispersion compensation amounts in the dispersion compensation sections 2b, 16 and 3a are set arbitrarily. As a result, a fact has been derived that the optimum estrangement amount has a substantially linear relationship with (increases in proportion to) the number of spans. In particular, in order to calculate an estrangement amount y2 with which optimum received signal quality can be obtained, a linear function expression given below as an expression (1) wherein the value of the number of spans of the transmission line 10×a transmission line dispersion coefficient is used as a variable x is derived:

$$y2 = Ax + B \qquad (1)$$

In particular, a simulation of received signal quality when an optical signal for which modulation is performed by DQPSK is transmitted from a sending end and is received at a receiver side through a transmission line is performed under the setting condition described above. As a result of the simulation, the estrangement amount y2 (in a unit of ps/nm) with which optimum received signal quality is obtained has a relationship of a linear function of the product of the transmission dispersion coefficient and the number of transmission spans as seen in FIG. 4.

It is considered that this relationship is substantially satisfied also where the transmission line fiber is formed using two different types of existing optical fibers (E-LEAF and TW-RS). It is to be noted that, in FIG. 4, the unit of the transmission line dispersion coefficient is ps/nm/km and a coordinate value denoted by a mark "●" is calculated with an optical fiber E-LEAF while a coordinate value denoted by another mark "Δ" is calculated with an optical fiber TW-RS.

Figure 4:
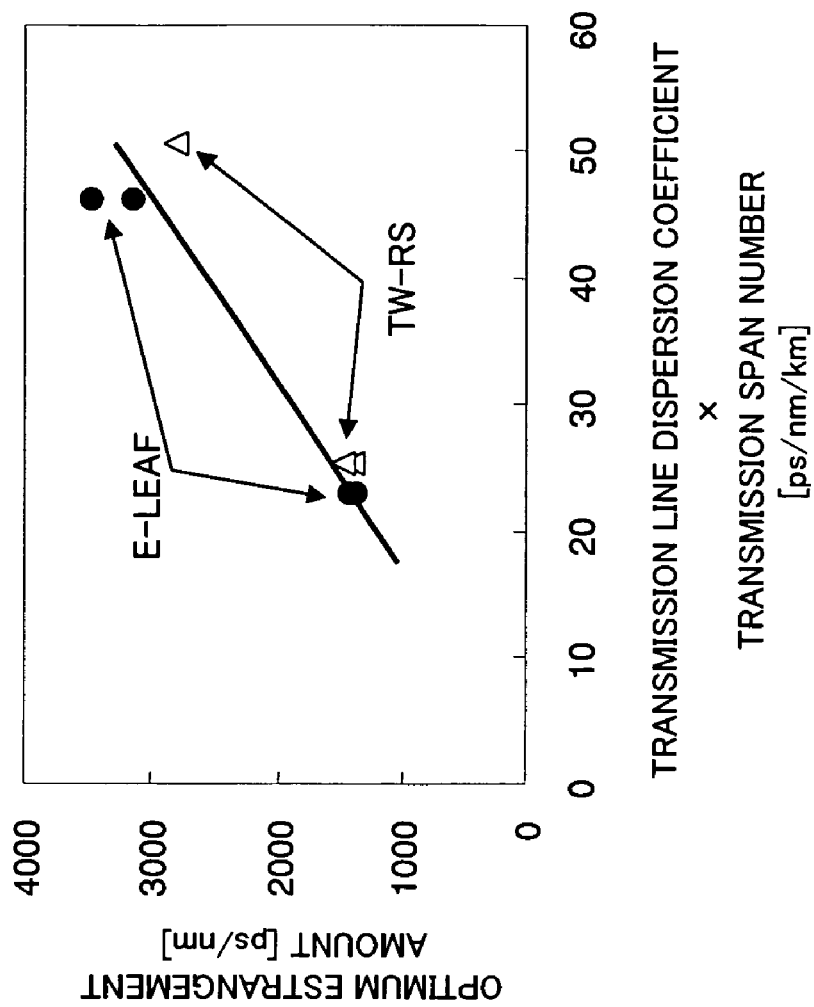
FIG. 4 is a diagram illustrating that an estrangement amount for acquiring optimum quality of a received signal has a relationship of a linear function of the product of a transmission line dispersion coefficient and the number of transmission spans.
Figure 5:
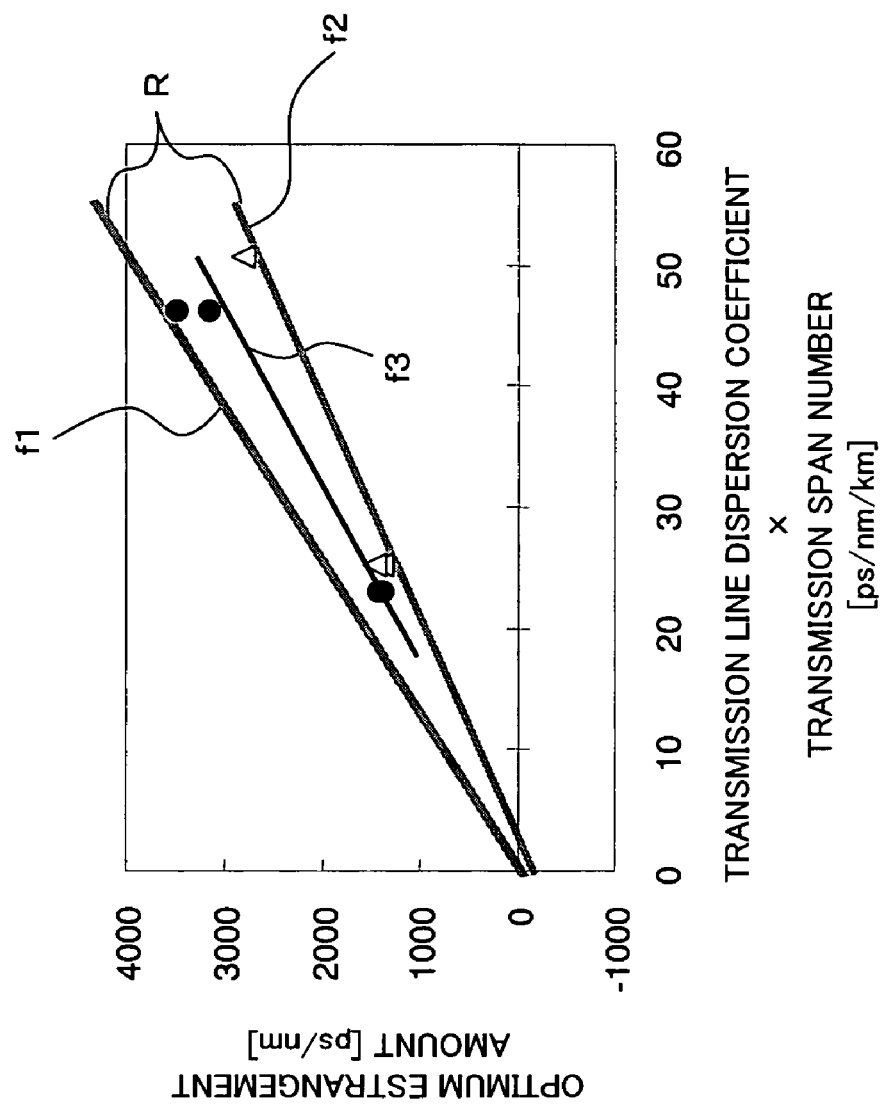
FIG. 5 is a diagram illustrating a linear function for calculating the estrangement amount (first estrangement amount) for acquiring optimum quality of a received signal from the product of the transmission line dispersion coefficient and the number of transmission spans.

According to the result illustrated in FIG. 4, if the value of the gradient A of a linear function expression regarding the estrangement amount y2 is set within a range from 56 to 80 and the value of the intercept B of the linear function is set within a range from −170 to −70 as seen in FIG. 5, then an estrangement amount (to be used as a barometer value of setting of a dispersion compensation amount) with which appropriate received signal quality can be acquired can be calculated in response to the transmission line dispersion coefficient and the number of transmission line spans. It is to be noted that, in FIG. 5, a linear function f1 indicates an example where the gradient A is set to 80 and the intercept B is set to −70, and another linear function f2 indicates another example where the gradient A is set to 56 and the intercept B is set to −170.

It is to be noted that a further function f3 which indicates an example where the gradient A is set to 68 and the intercept B is set to −162 is an example of a linear function expression which is approximately specified from coordinate values calculated from a result of measurement hereinafter described.

Further, if estrangement amounts within a range of a region R defined by the linear functions y2=f1 and y2=f2 are determined as a barometer range, then the dispersion compensation amounts in the dispersion compensation section 2b, 16 and 3a can be searched based on the estrangement amounts within the barometer range. Even this provides effective orientation at least in searching of a dispersion compensation amount.

On the other hand, if the values of the gradient A and the intercept B which define the linear function expression given hereinabove are suitably set in response to a signal modulation method, a kind of an optical fiber to be used and so forth, then also it can be expected that an estrangement amount having a higher degree of accuracy can be calculated.

[a-4] Measurement and Evaluation of Received Signal Quality in Response to Estrangement Amount The inventor of the present invention has varied the dispersion compensation amount in each of spans in combinations of dispersion compensation ratio of 80%, 100% and 120% using the two types of optical fibers of E-LEAF and TWRS under such conditions (a) to (h) as illustrated in FIG. 6 to measure and evaluate the received signal quality in a setting of a dispersion compensation amount within a range of the estrangement amount from 0 ps/nm to 3,000 ps/nm.

FIGS. 7 to 9, 10 to 12, and 13 to 15 individually illustrate part of a result wherein measurement of received signal quality is performed under the condition setting illustrated in FIG. 6. In the figures, the estrangement amount (ps/nm) which varies in response to setting of a dispersion compensation amount is indicated as an axis of abscissa, and the Q-penalty which indicates received signal quality (a lower value of the Q-penalty indicates higher received quality) is indicated as an axis of ordinate. As can be seen in the figures, for the same estrangement amount, a plurality of variations (combinations) is available depending upon setting of a dispersion compensation amount. Therefore, a plurality of sample values which indicate different levels of the received signal quality appear at a same position on the axis of abscissa.

Figure 7:
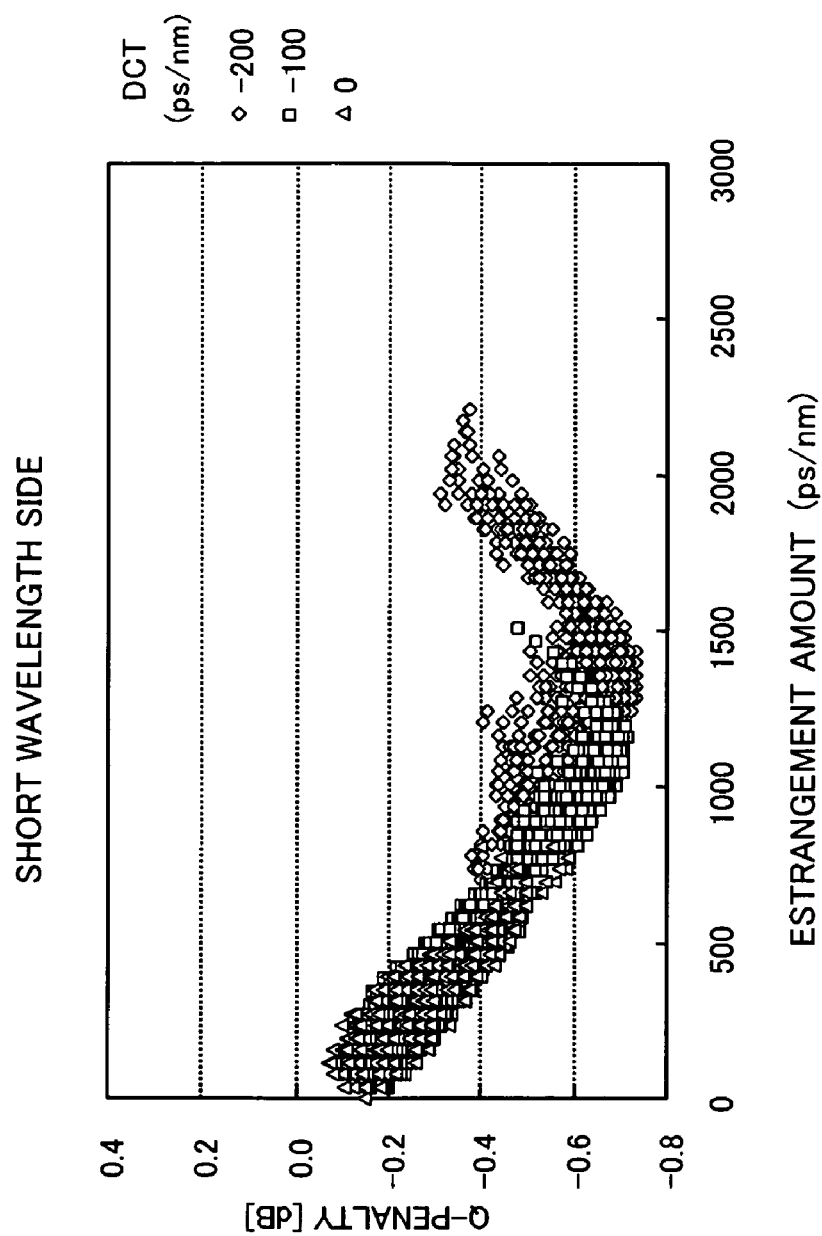
FIGS. 7 to 15 are diagrams each illustrating a result of measurement of the received signal quality of the optical transmission system.
Figure 8:
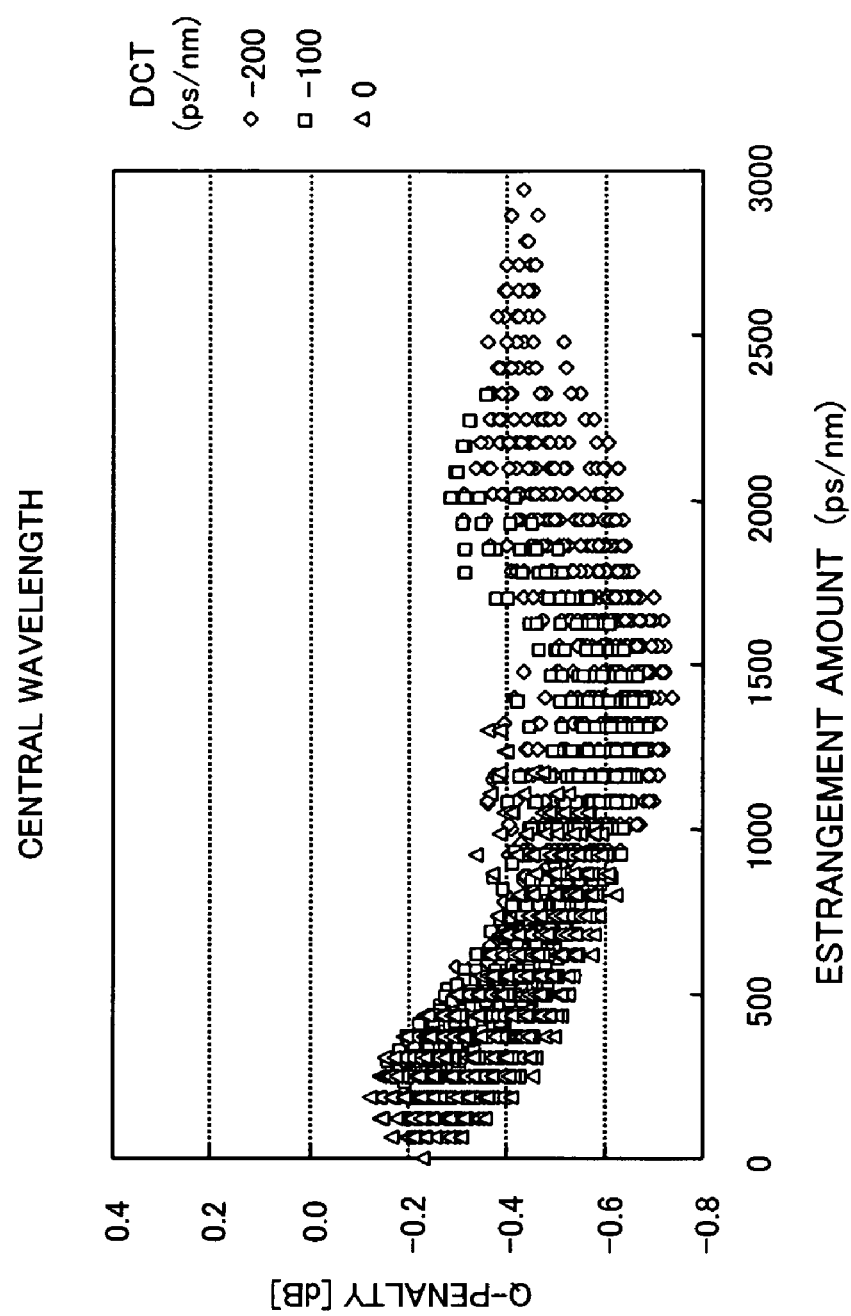
Figure 9:
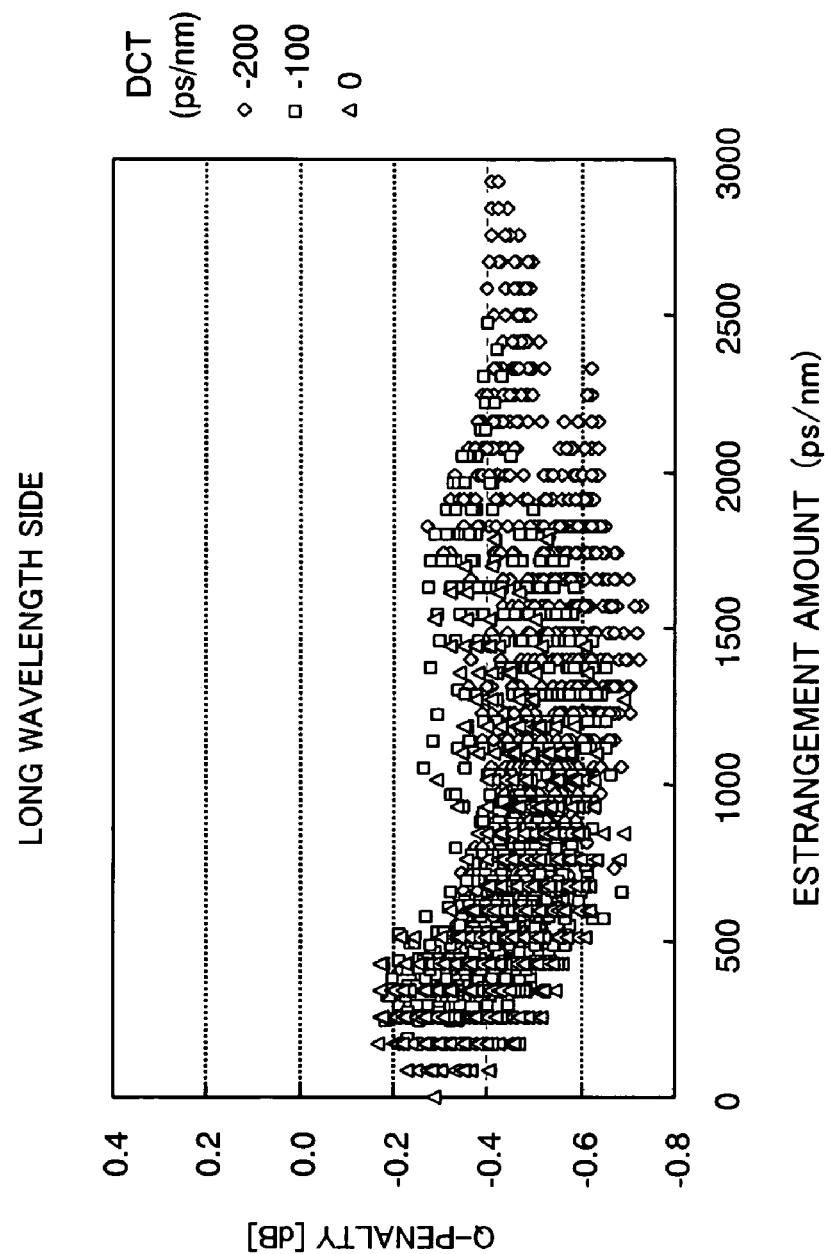
Figure 10:
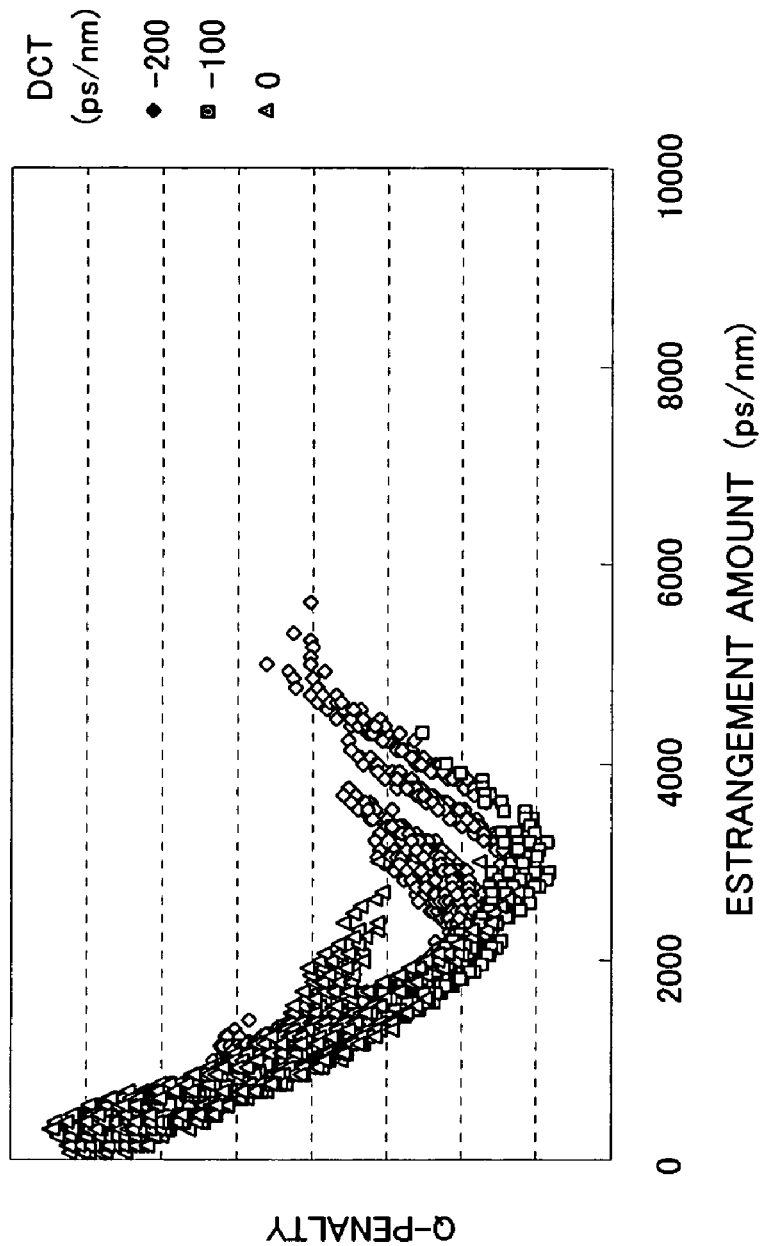
Figure 11:
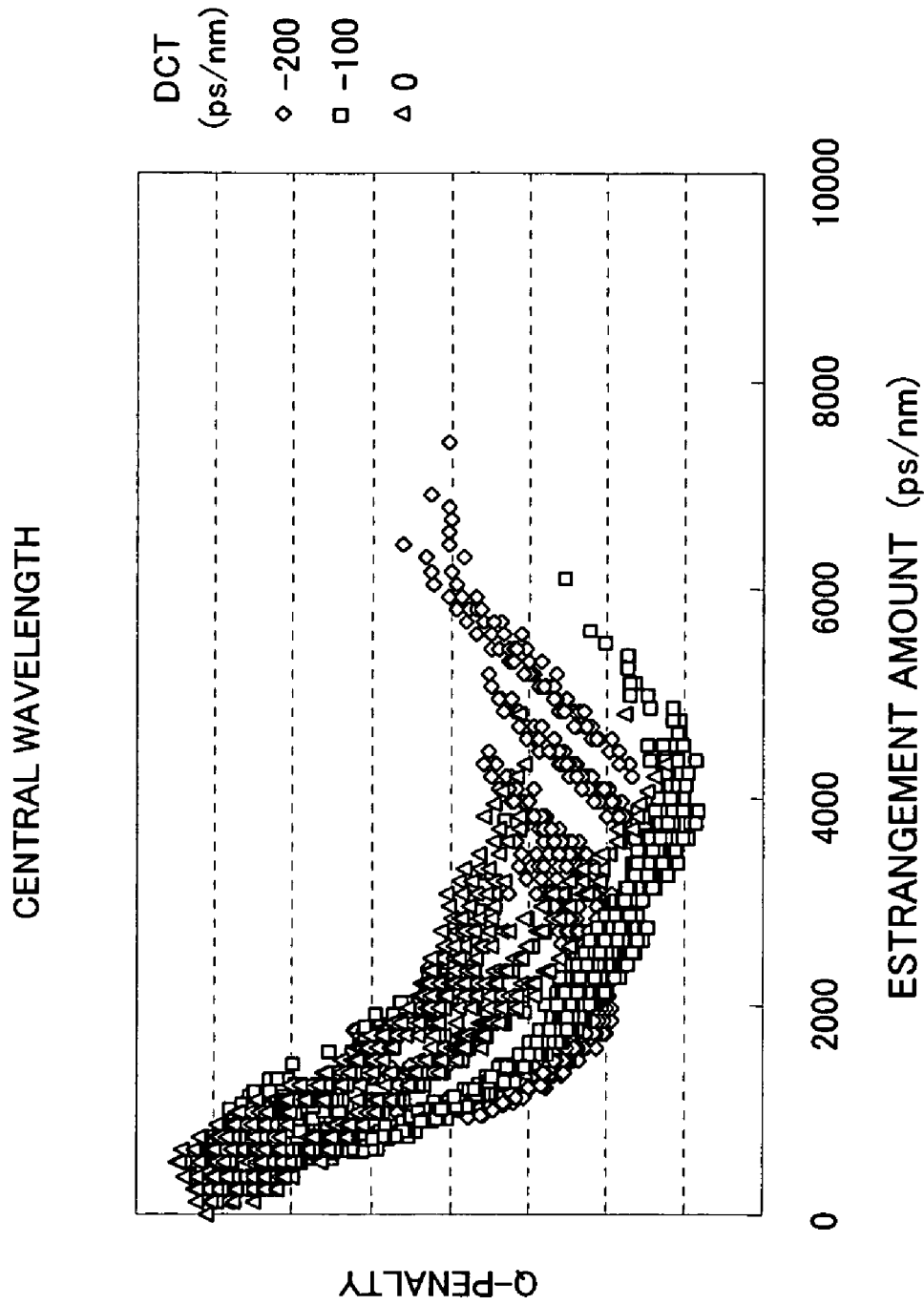
Figure 12:
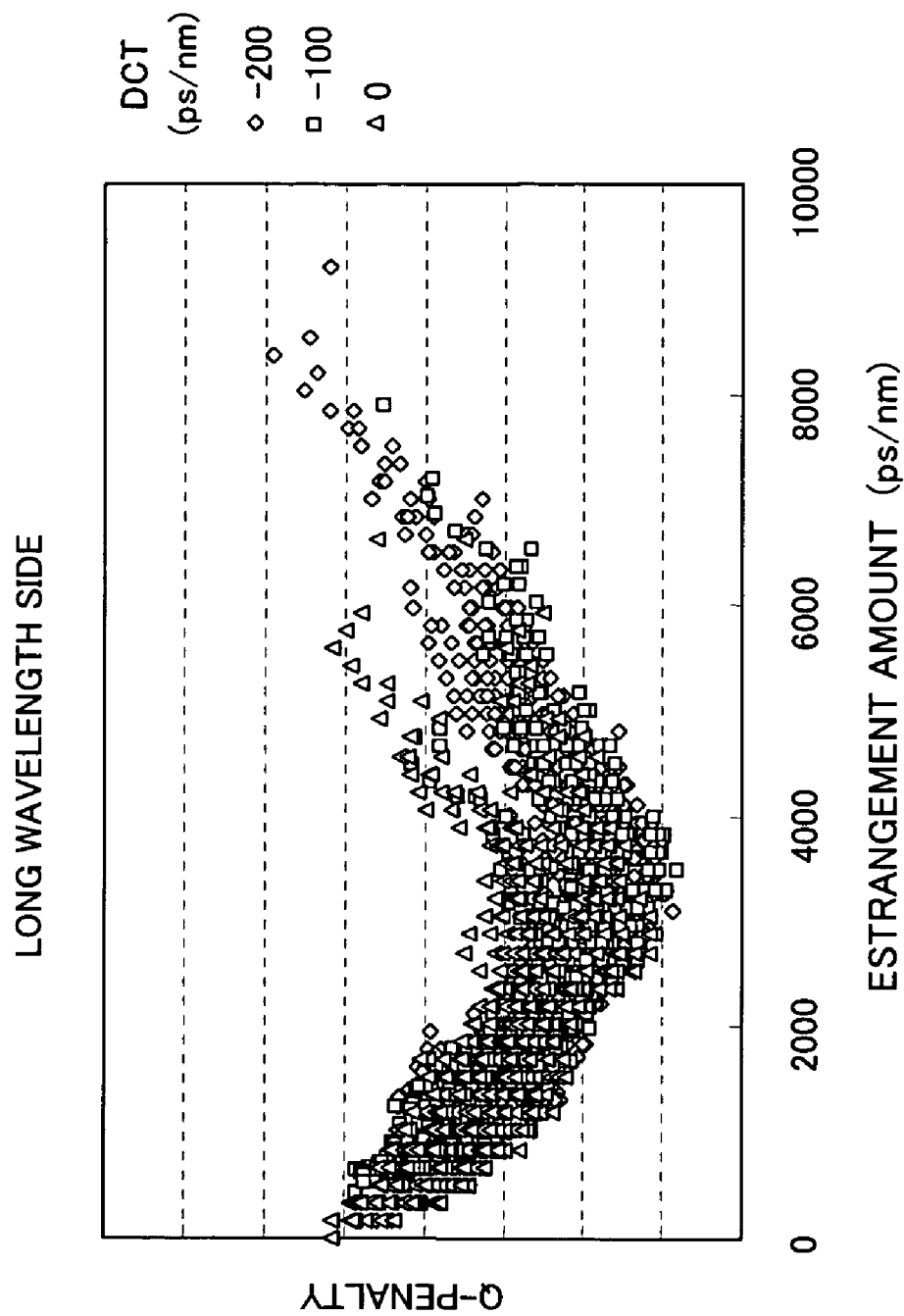
Figure 13:
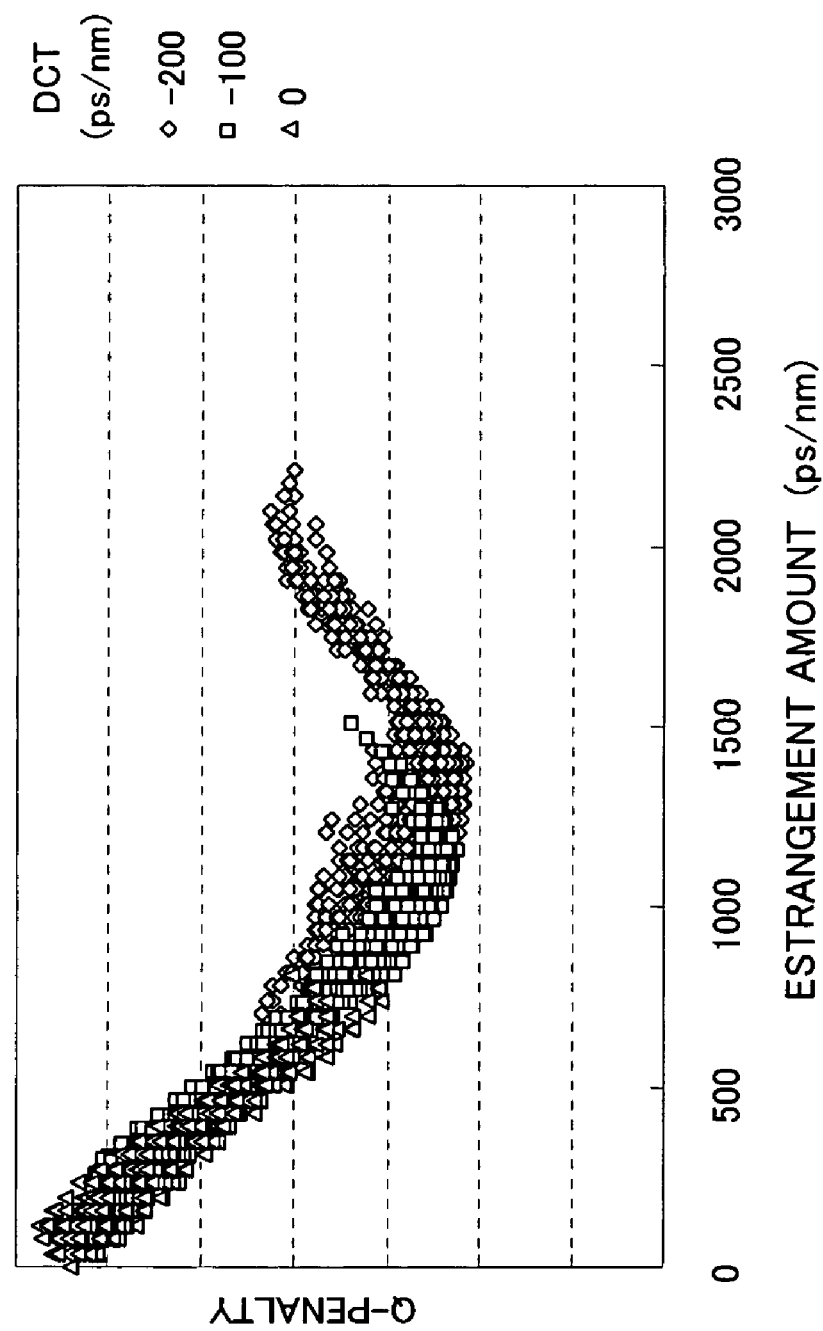
Figure 14:
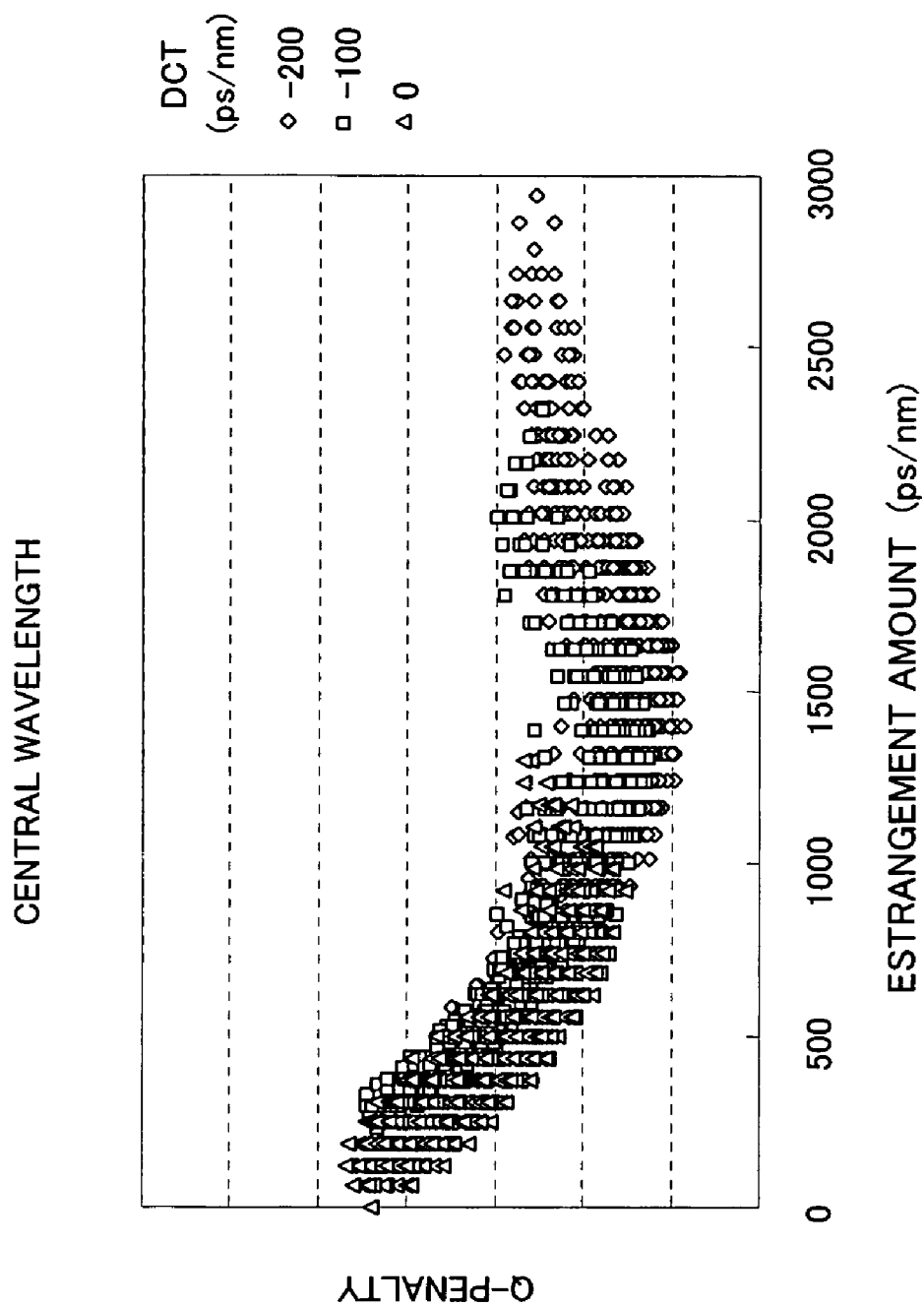
Figure 15:
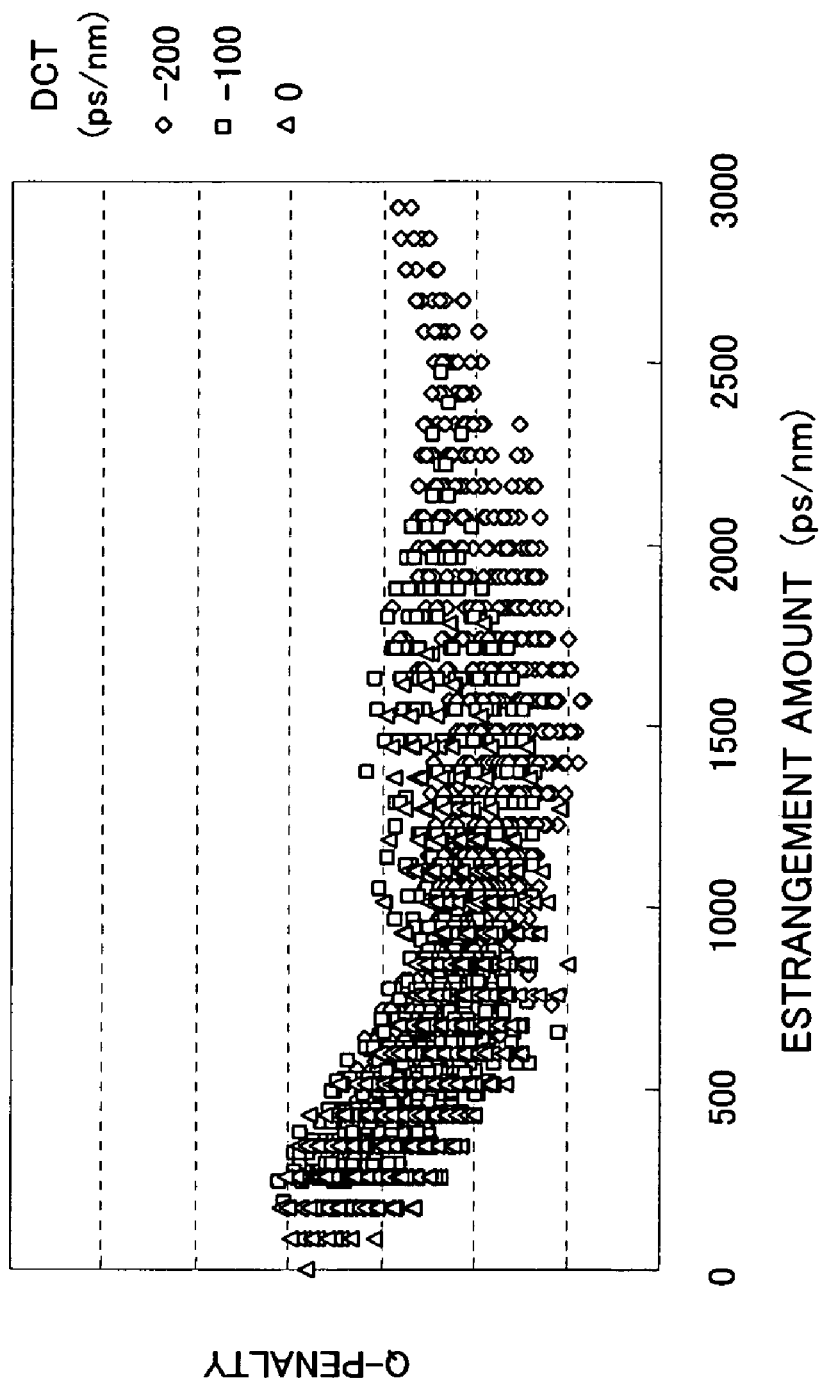

FIGS. 7 to 9 individually illustrate a result of measurement under the condition (b) illustrated in FIG. 6. FIGS. 10 to 12 individually illustrate a result of measurement under the condition (e) illustrated in FIG. 6. FIGS. 13 to 15 individually illustrate a result of measurement under the condition (c) illustrated in FIG. 6.

Further, FIGS. 7, 10, and 13 individually illustrate a result of measurement where short wavelength light in the C (Conventional) band is transmitted and FIGS. 8, 11 and 14 individually illustrate a result of measurement where intermediate wavelength light in the C (Conventional) band is transmitted, and FIGS. 9, 12 and 15 individually illustrate a result of measurement where long wavelength light in the C (Conventional) band is transmitted.

It is to be noted that, in FIGS. 7 to 9, 10 to 12 and 13 to 15, a plot pattern "◇" indicates an example wherein the pre-dispersion compensation amount (refer to reference character 2b in FIG. 1) is set to −200 ps/nm and another plot pattern "□" indicates an example wherein the pre-dispersion compensation amount is set to −100 ps/nm, and a further plot pattern "Δ" indicates an example wherein the pre-dispersion compensation amount is set to 0 ps/nm.

From the results of the measurement regarding the received signal quality, the facts (1) that estrangement amounts with which optimum received signal quality can be obtained are substantially equal to each other independently of the wavelength band, (2) that estrangement amounts with which optimum received signal quality can be obtained are substantially equal to each other independently of the fiber input power which is a function of the SPM and (3) that estrangement amounts with which optimum received signal quality can be obtained vary depending upon the number of transmission spans, can be found out.

Accordingly, based on the results of the measurement under the conditions (a) to (h) described above, a product of a transmission line dispersion coefficient which indicates a chromatic dispersion of an optical fiber to be applied and the number of spans and an optimum estrangement amount can be indicated as a one-by-one corresponding relationship as seen in FIGS. 4 and 5. Then, the relationship between the product of the transmission line dispersion coefficient and the number of spans and the optimum estrangement amount can be formulized as such a linear function expression as given above as the expression (1), and also the ranges of the gradient A and the intercept B can be specified.

[a-5] Example of Setting of Dispersion Compensation Amount by Optical Transmission System 1 of FIG. 1

Also in the optical transmission system 1 having six transmission spans shown in FIG. 1, the optimum estrangement amount y2 can be specified uniquely by arithmetic operation of the expression (1) given hereinabove. In particular, the dispersion compensation amount by each of the dispersion compensation sections 2b, 16 and 3a in the transmitter 2, repeater 11 to 15 and receiver 3 can be determined so that the sum total (estrangement amount) of absolute values of residual dispersion amounts remaining after the dispersion compensation by the dispersion compensation sections 2b, 16 or 3a in the transmitter 1, repeater 11 to 15 or receiver 3 increases substantially in proportion to the number (6) of the repeaters which interconnect equipments adjacent to each other on the transmission line 10.

Figure 16:
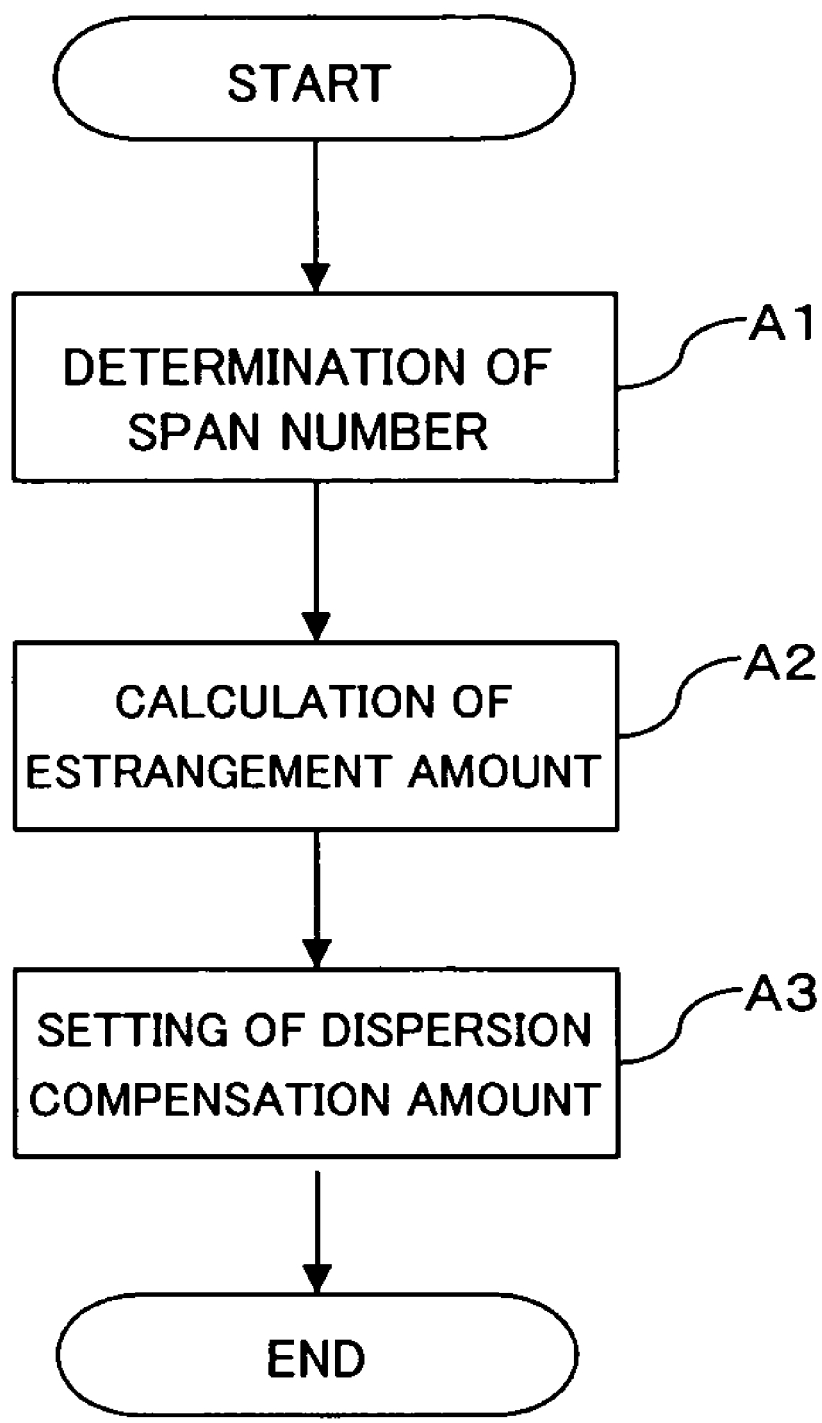
FIG. 16 is a flow chart illustrating operation of the optical transmission system according to the first embodiment of the present invention.

In particular, referring to FIG. 16, when the optical transmission system 1 is to be configured, the number of spans is determined (step A1). Then, in response to the determined number of spans, a value (estrangement amount) to be set as a sum total of absolute values of the residual dispersion amounts remaining after the dispersion compensation by the dispersion compensation sections 2b, 16 or 3a in the equipments 2, 11 to 15 or 3 is calculated by performing arithmetic operation of the linear function expression given hereinabove as the expression (1) (step A2). Thereafter, the dispersion compensation amount in the dispersion compensation section 2b, 16 or 3a in the equipments 2, 11 to 15 or 3 is determined based on the derived value to be set as the sum total of residual dispersion amounts or the sum total of absolute value of the residual dispersion amounts (step A3).

Where the number of spans is determined to be six as in the case shown in FIG. 1, a value of approximately 1,400 ps/nm can be calculated as the optimum estrangement amount, for example, by calculation using the expression (1) given hereinabove wherein the gradient A is set to 56 to 80 and the intercept B is set to −70 to −170, although it depends also upon the dispersion coefficient of selected transmission line fiber.

In particular, in a conventional technique, it is necessary to evaluate the received signal quality for variations of setting of a dispersion compensation amount in the dispersion compensation sections 2b, 16 and 3a in the transmitter 2, repeater 11 to 15 and receiver 3, for example, regarding all of the measurement points shown in FIG. 7. In contrast, according to the present embodiment, if only variations of setting of a dispersion compensation amount with regard to the pertaining optimum estrangement amount are evaluated using the optimum estrangement amount of 1,400 ps/nm calculated in such a manner as described above, then searching for setting of an optimum dispersion compensation amount can be performed readily.

Figure 17A:
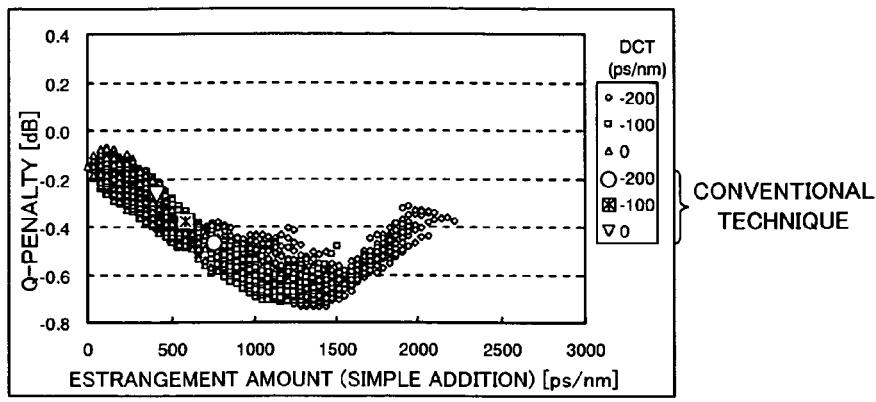
FIGS. 17(a) to 17(c) are diagrams each illustrating a relative positional relationship regarding measurement points where a conventional setting method for a chromatic dispersion compensation amount is adopted in the measurement point distributions illustrated in FIGS. 7 to 9, respectively.
Figure 17B:
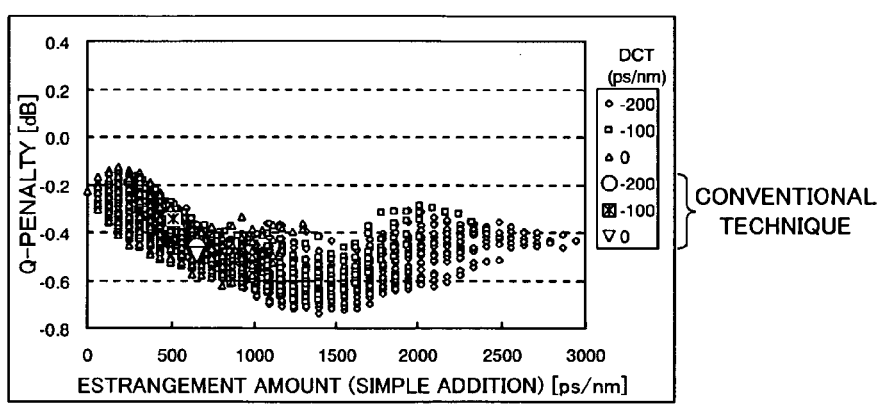
Figure 17C:
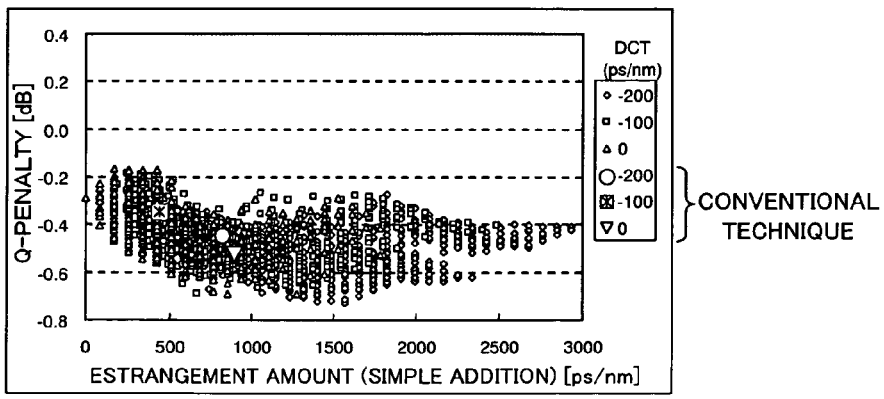
Figure 18A:
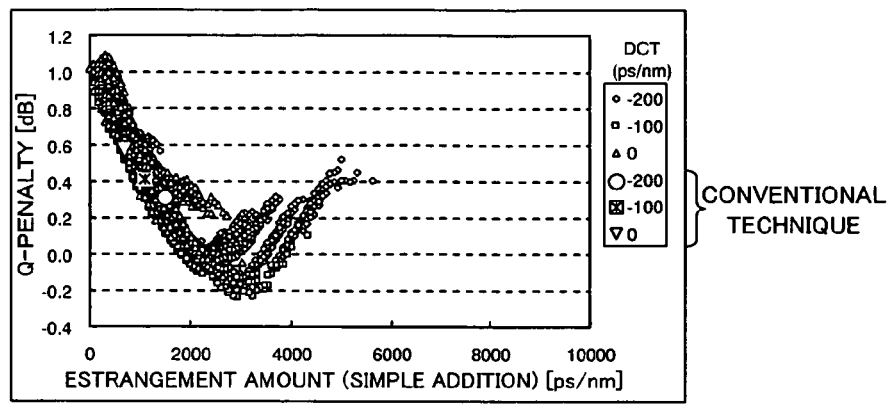
FIGS. 18(a) to 18(c) are diagrams each illustrating a relative positional relationship regarding measurement points where a conventional setting method for a chromatic dispersion compensation amount is adopted in the measurement point distributions illustrated in FIGS. 10 to 12, respectively.
Figure 18B:
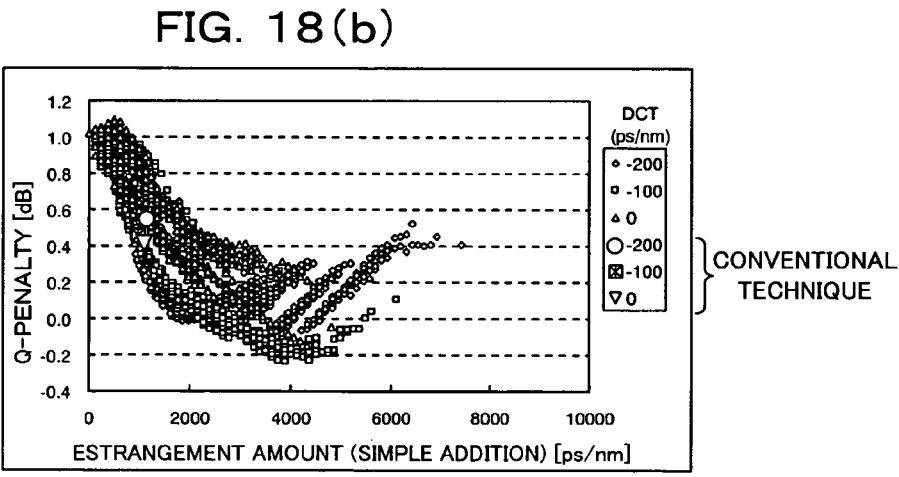
Figure 18C:
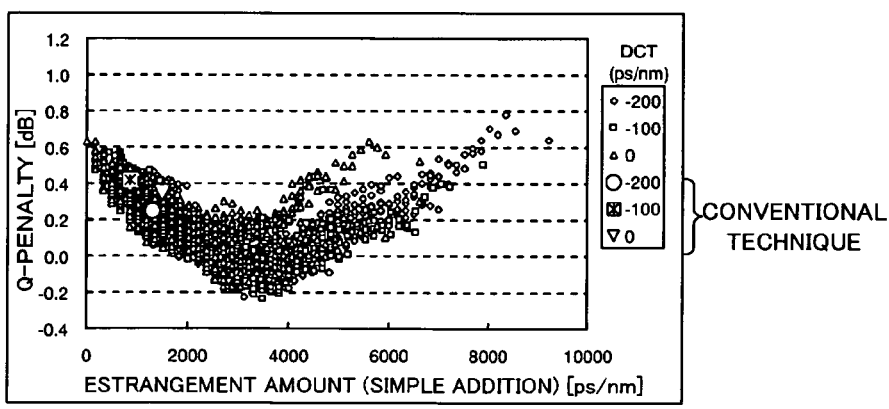

FIGS. 17(*a*) to 17(*c*) individually illustrate a relative positional relationship of measurement points where such a setting method of a chromatic dispersion compensation amount as disclosed in Patent Document 1 is adopted in the measurement point distributions illustrated in FIGS. 7 to 9, respectively. Further, FIGS. 18(*a*) to 18(*c*) individually illustrate a relative positional relationship of measurement points where such a setting method of a chromatic dispersion compensation amount as disclosed in Patent Document 1 is adopted in the measurement point distributions illustrated in FIGS. 10 to 12, respectively.

In the figures, a plot pattern "○" indicates a measurement point where the pre-dispersion compensation amount refer to reference character 2b in FIG. 1 is set to −200 ps/nm and another plot pattern ["*" in "□"] indicates a measurement point where the pre-dispersion compensation amount is set to −100 ps/nm, and a further plot pattern "∇" indicates a measurement point where the pre-dispersion compensation amount is set to 0 ps/nm.

It can be recognized from the plot patterns "○", ["*" in "□"], and "∇" in FIGS. 17(*a*) to 17(*c*) and 18(*a*) to 18(*c*) that, if only such a designing method of a dispersion compensation amount in a transmission span as examined when an optical signal of the NRZ modulation method is transmitted as disclosed in Patent Document 1 is used as it is when an optical signal of the DQPSK modulation method is transmitted, it is difficult to acquire satisfactory signal quality. In contrast, if an optimum estrangement amount is calculated in such a manner as described in the description of the present embodiment, then the calculated optimum estrangement amount can be used as a useful term when setting of an optimum dispersion compensation amount is searched. Therefore, searching in setting of an optimum dispersion compensation amount can be performed easily.

Further, if such setting of a dispersion compensation amount that the calculated optimum estrangement amount of 1400 ps/nm is obtained is adopted, then the sample value distribution where the optimum estrangement amount of 1,400 ps/nm is obtained exhibits a generally good distribution of the received signal quality even in comparison with that of sample values with which another estrangement amount, for example, of 500 ps/nm or 2,500 ps/nm is obtained as seen in FIGS. 7 to 9, 10 to 12 and 13 to 15.

In particular, whichever one of combinations of a group of setting of dispersion compensation amounts with which the optimum estrangement amount of 1,400 ps/nm is obtained is adopted, if setting of a dispersion compensation amount is adopted at least in accordance with the optimum estrangement amount 1,400 ps/nm, then some degree of received signal quality can be secured.

In this manner, with the first embodiment of the present invention, a value to be set as a sum total of residual dispersion amounts remaining after dispersion compensation by the dispersion compensation section 2b, 16 or 3a in the transmitter 2, repeater 11 to 15 or receiver or a sum total of absolute values of such residual dispersion amounts can be calculated by arithmetically operating a linear function expression in accordance with the determined number of repeaters, and a dispersion compensation amount in the dispersion compensation section 2b, 16 or 3a in the equipments 2, 11 to 15 or 3 can be determined based on the value to be set as the derived sum total of the residual dispersion amounts or the derived sum total of the absolute values of the residual dispersion amounts. Therefore, the sum total of the residual dispersion amounts or the sum of the absolute values of the residual dispersion amounts with which good received signal quality can be can be obtained can be calculated by simple arithmetic operation, and, if the sum total or the sum total of the absolute values is used for searching in setting of a dispersion compensation amount, then this makes useful orientation for obtaining setting for achieving good received signal quality good. Consequently, when compared with an alternative case wherein measurement and evaluation of the received signal quality are performed for random setting of a dispersion compensation amount, the load applied to development of an optical transmission system can be broadly decreased.

Further, with the optical transmission system 1 of the first embodiment, the dispersion compensation amount in any of the dispersion compensation sections 2b, 16 and 3a in the transmitter 2, repeater 11 to 15 and receiver 3 is determined such that the sum total of absolute values of residual dispersion amounts remaining after the dispersion compensation by the dispersion compensation sections 2b, 16 or 3a increases substantially in proportion to the number of repeaters for interconnecting equipments adjacent to each other on the transmission line 10 (that is, in proportion to the number of spans). Therefore, good received signal quality can be achieved.

[a'] Modifications to the First Embodiment

While, in the first embodiment described above, the sum of absolute values of residual dispersion amounts remaining after dispersion compensation by the dispersion compensation section 2b, 16 or 3a in the transmitter 2, repeater 11 to 15 or receiver 3 is used as the estrangement amount (first estrangement amount), the present invention is not limited to this. For example, the sum total of residual dispersion amounts maybe used as the estrangement amount (second estrangement amount). Also in a case wherein such a sum of residual dispersion amounts as just mentioned is used as the estrangement amount, a dispersion compensation amount with which good received quality can be achieved can be set in the optical transmission system 1, and advantages similar to those in the first embodiment described above can be obtained.

Figure 20:
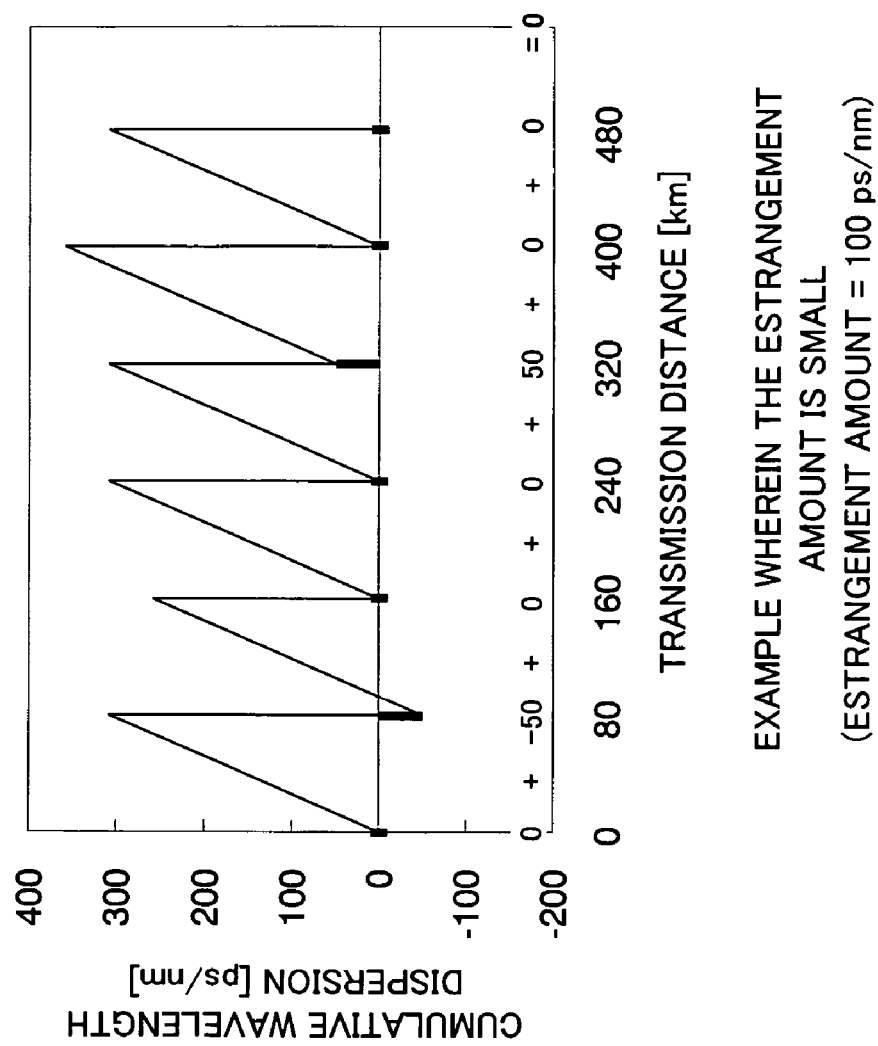

For example, shown in FIG. 19, where, in the optical transmission system 1 similar to that of FIG. 1 described above, the residual dispersion amount remaining after the dispersion compensation by the dispersion compensation sections 2b, 16 and 3a in the transmitter 2, repeater 11 to 15 and receiver 3 is −100, −150, −100, −150, −100, −100, and −50 in a unit of ps/nm as seen in FIG. 19, the estrangement amount is calculated as −750 ps/nm which is the sum total of the values given just above. Further, where the residual dispersion amount corresponding to that of FIG. 19 is 0, −50, 0, 0, +50, 0, 0 as seen in FIG. 20, the estrangement amount is 0 ps/nm which is the sum total of the values given just above.

Where the estrangement amount (second estrangement amount) is defined as the sum total of residual dispersion amounts in such a manner as described above, the linear function expression for deriving the optimum estrangement amount y1 to be used as a barometer value when a dispersion compensation amount in any of the dispersion compensation sections 2b, 16 and 3a in the transmitter 2, repeater 11 to 15 and receiver 3 is searched can be given not only as an expression [refer to expression (1')] having an gradient A and an intercept B similar to those in the first embodiment described above but also as such a linear function expression as given as an expression (2) wherein the polarities of the gradient A and the intercept B are inversed.

$$y1 = Ax + B \quad (1')$$

$$y1 = (-A)x + (-B) \quad (2)$$

This indicates that a sample pattern of the received signal quality regarding a (first) estrangement amount which appears as a positive value in the arithmetic operation of absolute values appears similarly also in a region of negative values of the second estrangement amount.

Figure 21:
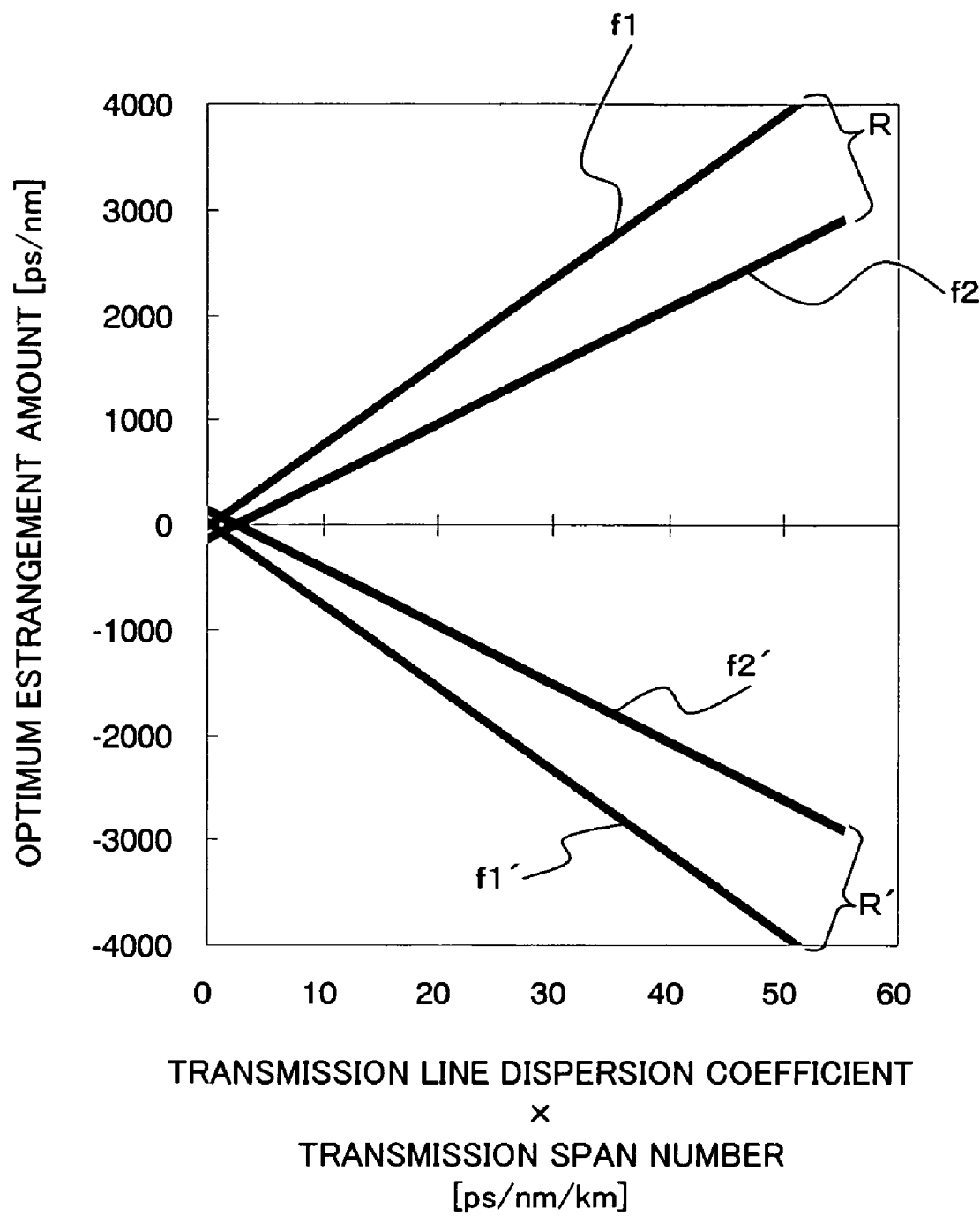
FIG. 21 is a diagram illustrating a linear function for calculating an estrangement amount (second estrangement amount) for acquiring optimum quality of a received signal from the product of a transmission line dispersion coefficient and the number of transmission spans.

For example, where the DQPSK modulation method similar to that in the first embodiment is applied as a modulation method, the value of the gradient A which forms the linear function expression regarding the estrangement amount y1 can be set not only to the range from 56 to 80 but also to another range from −80 to −56 and the value of the intercept B can be set not only to the range from −170 to −70 but also to another range from 70 to 170 as shown in FIG. 21.

Also where the values of the gradient A and the intercept B are set as just described, the estrangement amount y1 (to be used as a barometer value upon setting of a dispersion compensation amount) with which optimum received signal quality can be achieved can be calculated only in response to the transmission line dispersion coefficient and the number of transmission line spans. It is to be noted that, in FIG. 21, a linear function f1' indicates an example wherein the gradient (−A) is set to −80 and the intercept (−B) is set to 70, and another linear function f2' indicates an example wherein the gradient (−A) is set to −56 and the intercept (−B) is set to 170.

Further, if estrangement amounts within a range of a region R' defined by the linear functions y1=f1' and y2=f2' are considered as a barometer range, then a dispersion compensation amount can be searched based on the estrangement amounts not only in the barometer range R but also in the barometer range R' in the dispersion compensation section 2b, 16 or 3a. Also if a dispersion compensation amount is searched in this manner, useful orientation at least in searching of a dispersion compensation amount can be achieved.

The inventor of the present invention has measured and evaluated the received signal quality similar to that in the first embodiment described above also for a case wherein a simple addition value of residual dispersion amounts in each span is used as the estrangement amount. As a result, it has been derived that not only the linear function expression (1') in the first embodiment described above but also the expression (2) wherein the polarities of the gradient A and the intercept B in the linear function expression (1') are inversed can be used as a linear function expression for deriving the optimum estrangement amount y1 as described below.

In particular, FIGS. 22 to 24, 25 to 27 and 28 to 30 individually illustrate a result of measurement of the second estrangement amount (ps/nm) which varies in response to setting of a dispersion compensation amount under the conditions corresponding to those in the first embodiment described above. In the figures, the simple addition value of residual dispersion value is indicated as a coordinate of an axis of abscissa and a Q-penalty which indicates the received signal quality is indicated as a coordinate of an axis of ordinate.

Figure 22:
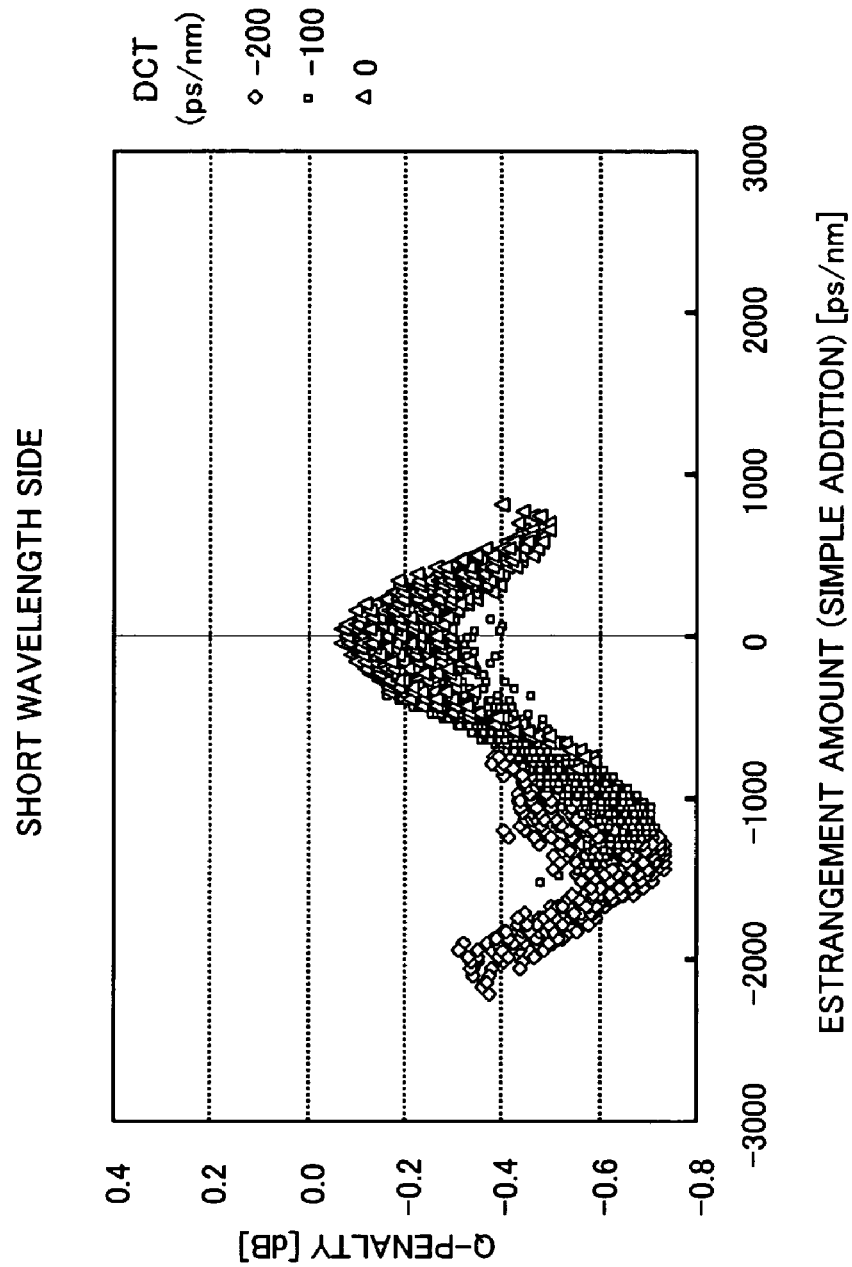
FIGS. 22 to 30 are diagrams each illustrating a result of measurement of the received signal quality of the optical transmission system.
Figure 23:
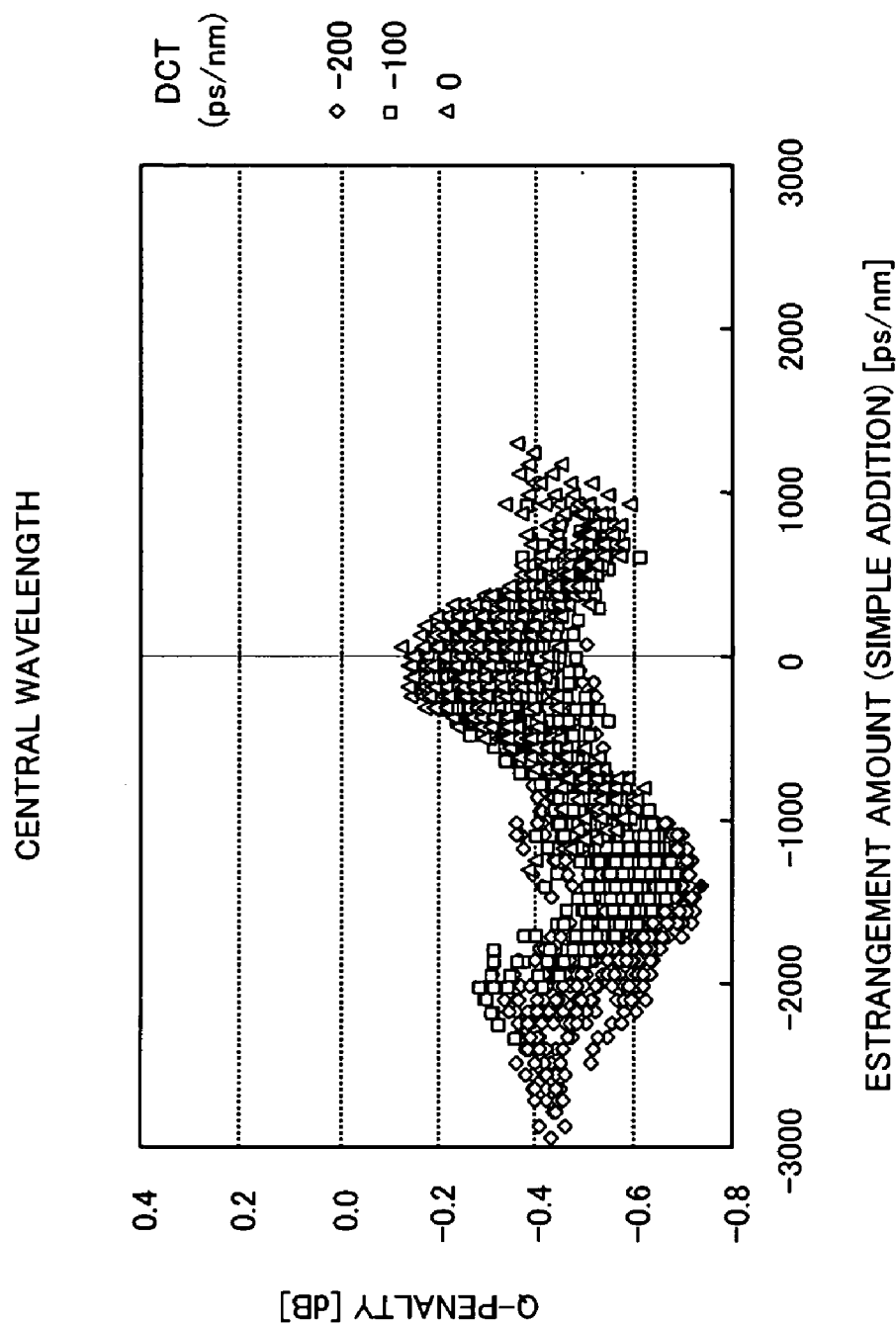
Figure 24:
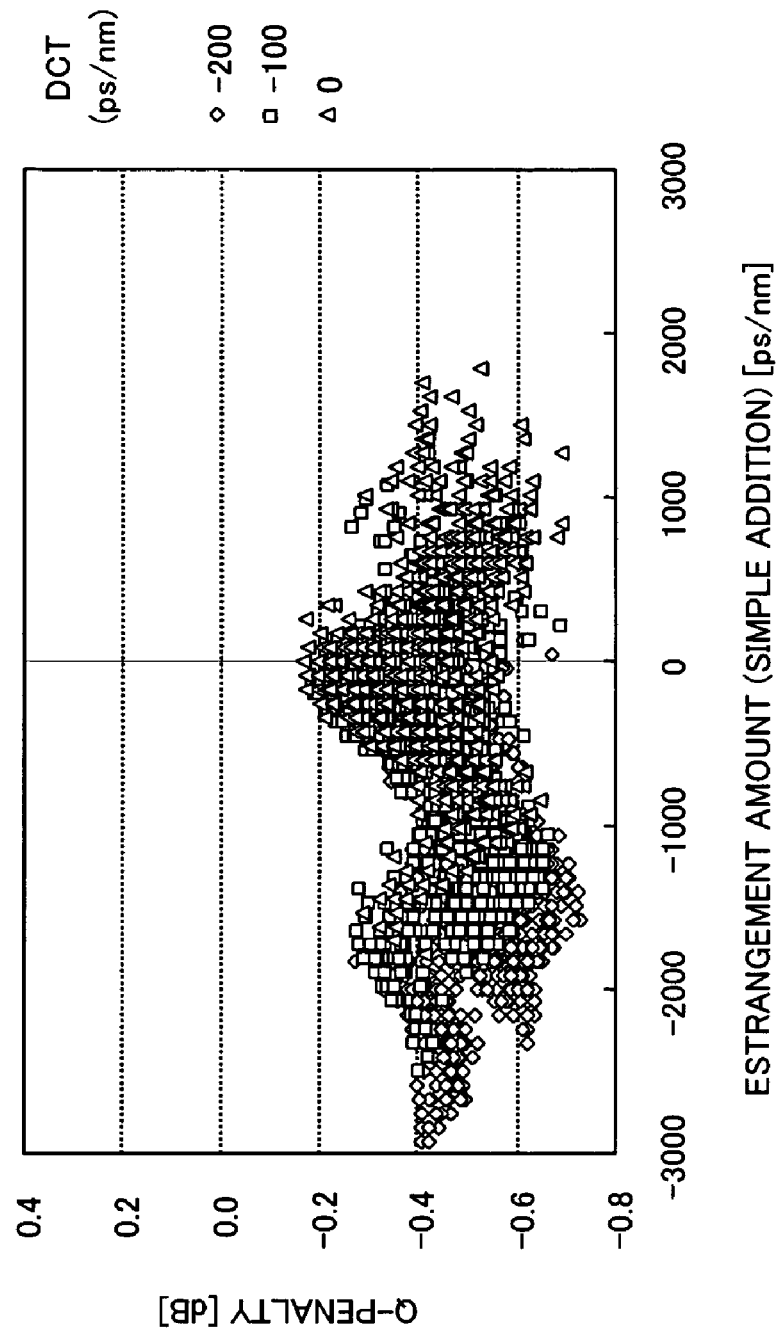
Figure 25:
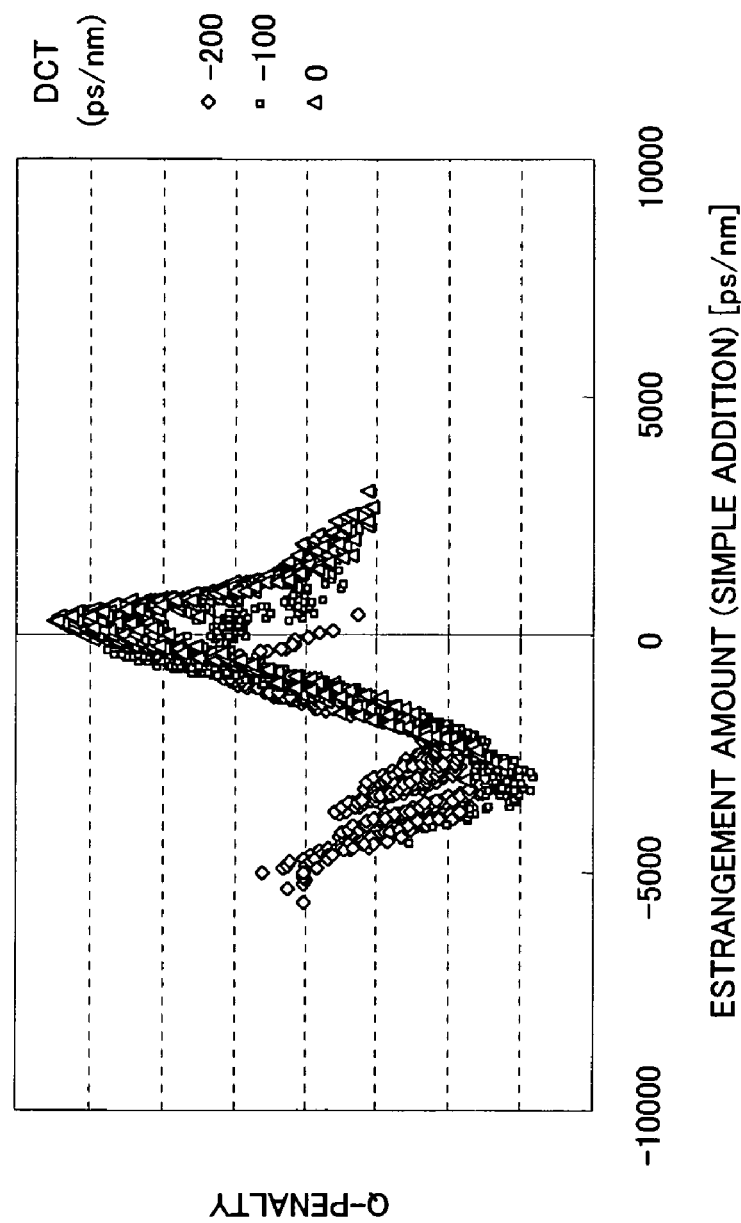
Figure 26:
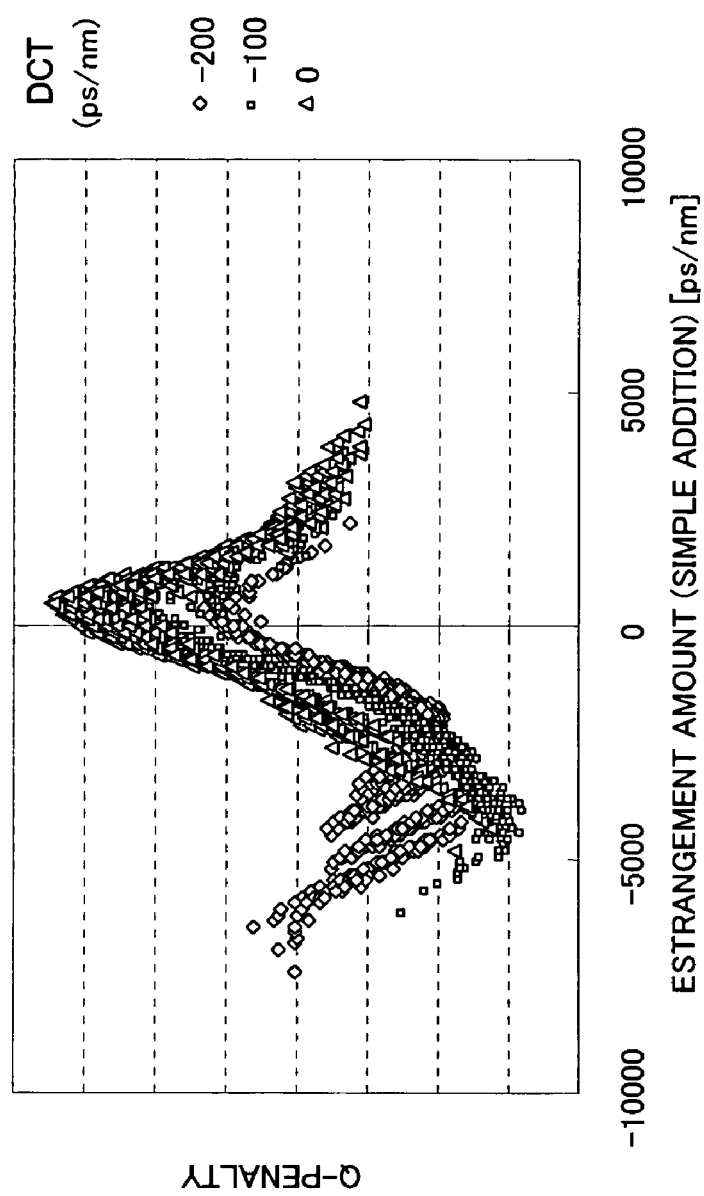
Figure 27:
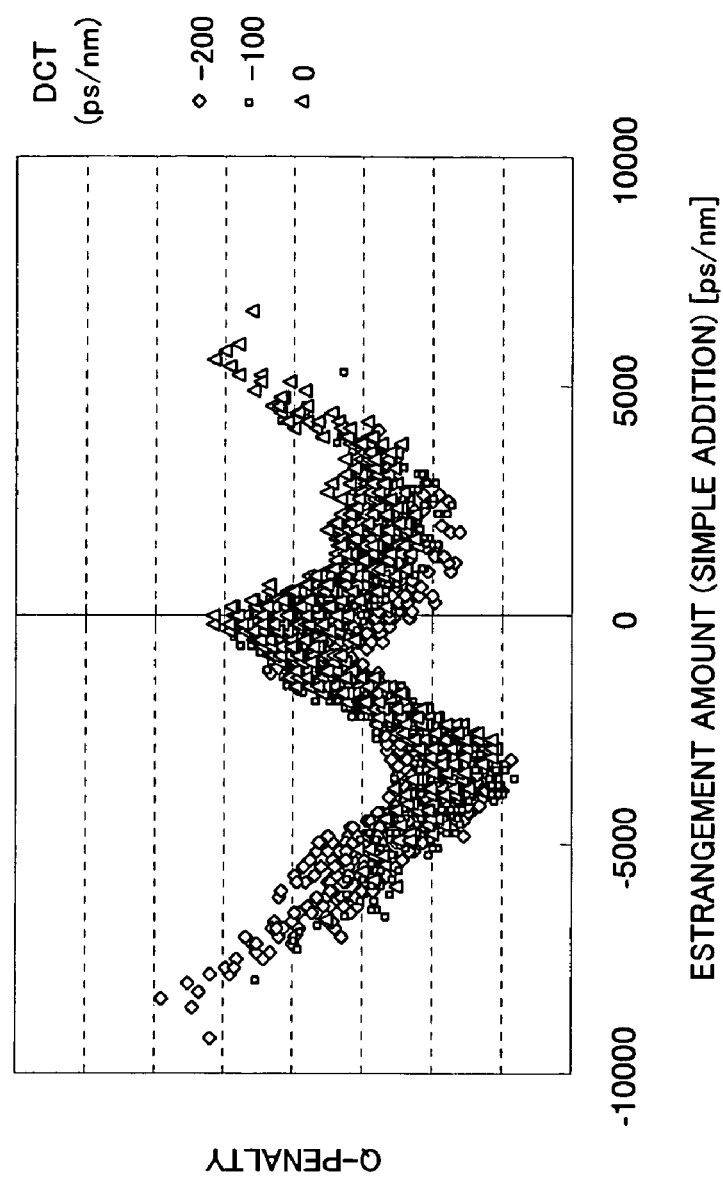
Figure 28:
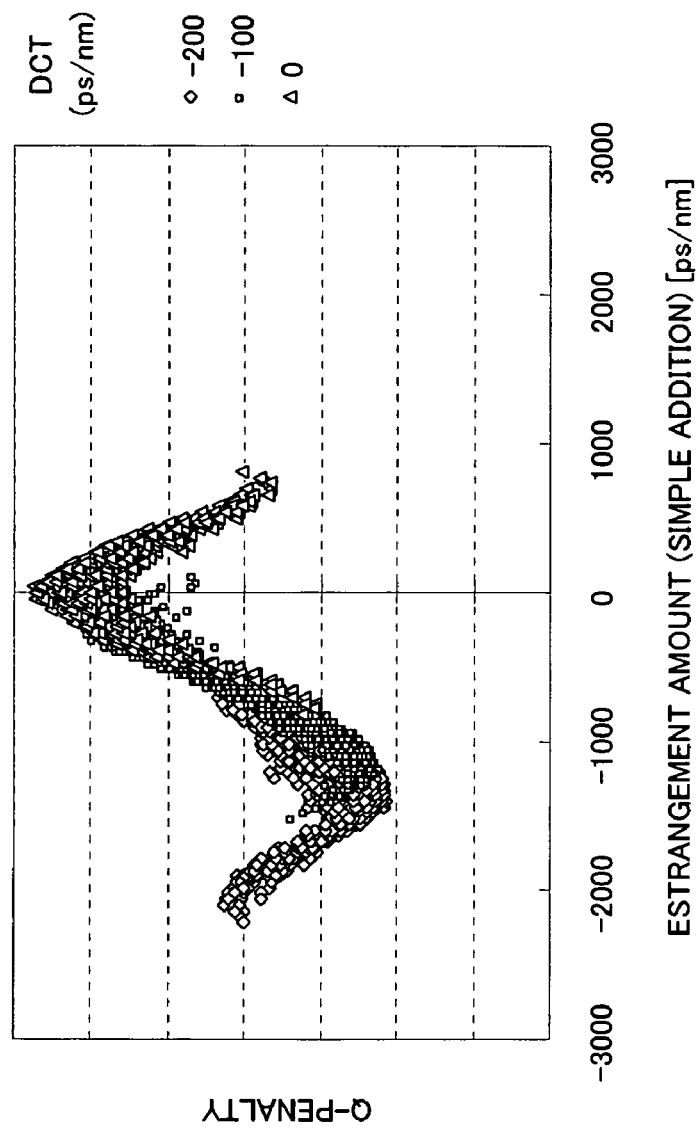
Figure 29:
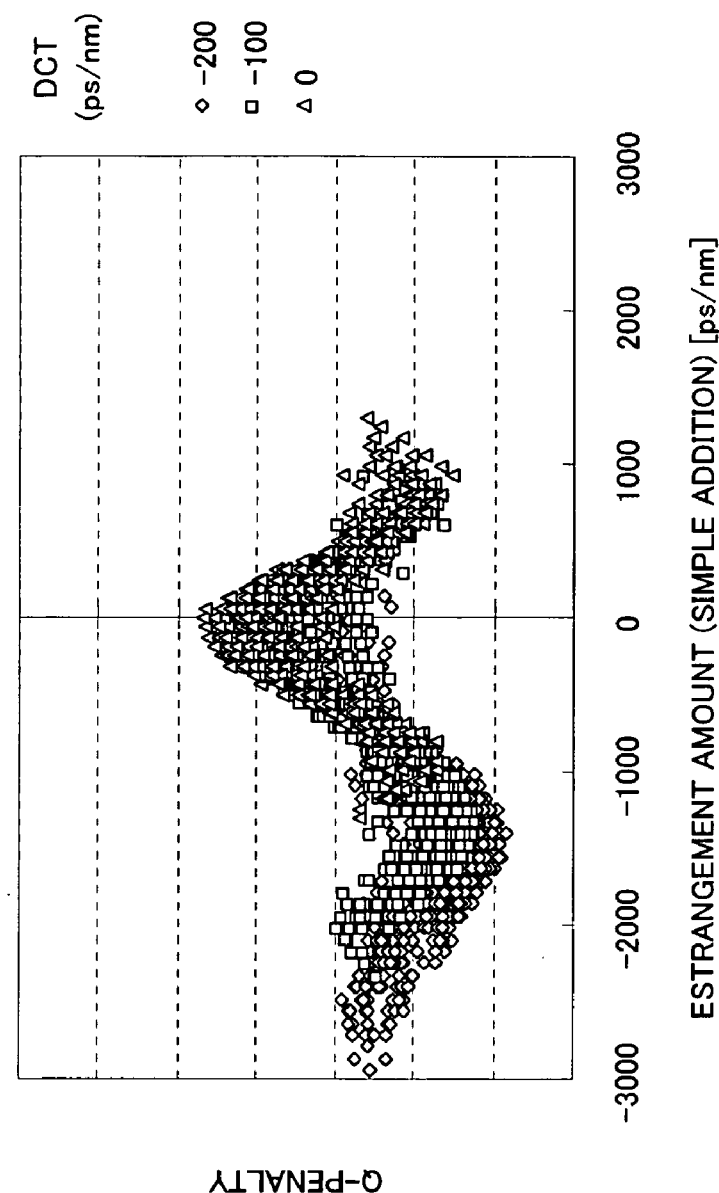
Figure 30:
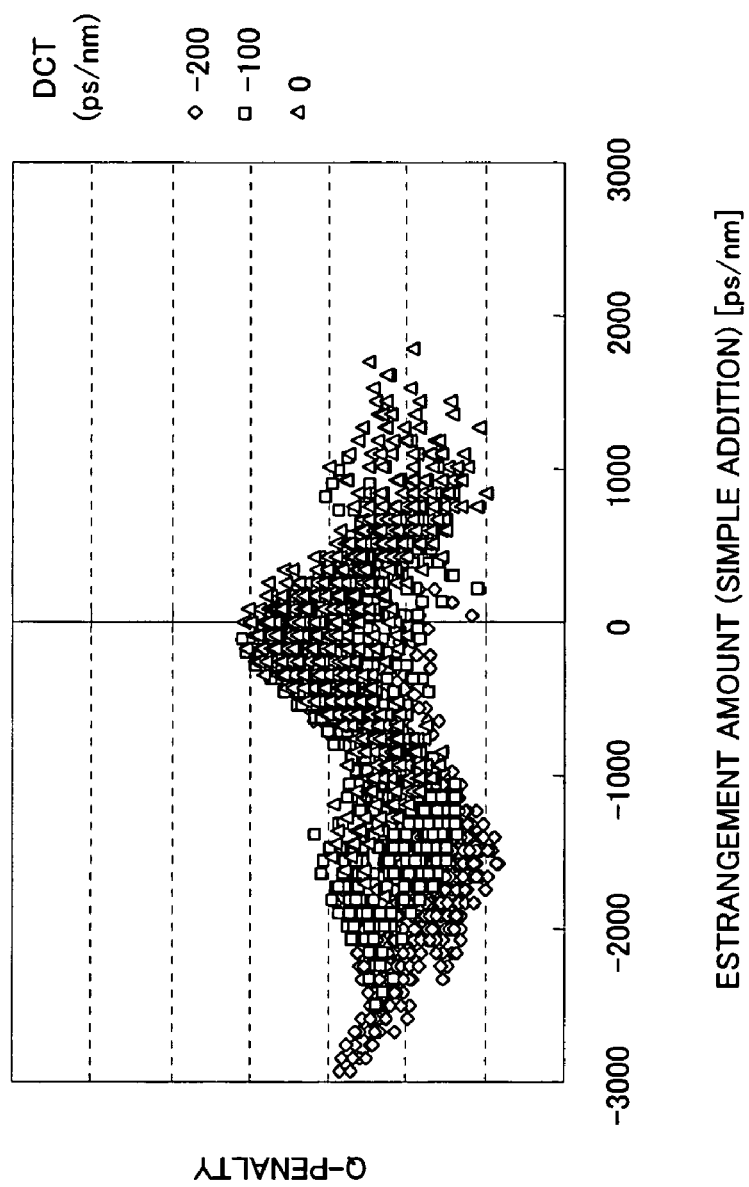

The setting of the conditions in FIGS. 22 to 24 corresponds to that in FIGS. 7 to 9, respectively. The setting of the conditions in FIGS. 25 to 27 corresponds to that in FIGS. 10 to 12, respectively. The setting of the conditions in FIGS. 28 to 30 corresponds to that in FIGS. 13 to 15, respectively. Also in this instance, for the same estrangement amount, a plurality of variations is available depending upon setting of a dispersion compensation amount. Therefore, a plurality of sample values which indicate different levels of the received signal quality appear at a same position on the axis of abscissa.

It is to be noted that FIGS. 22 to 24, 25 to 27 and 28 to 30 are shown particularly taking notice of the fact that an estrangement amount with which optimum received signal quality can be achieved can be obtained also in a region wherein the simple addition value is a negative value. Therefore, variations of the dispersion compensation amount with regard to a case wherein the pre-dispersion amount is set to +200 ps/nm are not shown in the figures.

It is a matter of course that, f the measurement result where the pre-dispersion amount is set to +200 ps/nm is included also in a region wherein the simple addition value is a positive value, then the estrangement amount of a positive value with which optimum received signal quality can be achieved can be obtained similarly as in the first embodiment described above.

Accordingly, from the measurement results, the product of the transmission line dispersion coefficient which indicates a chromatic dispersion of an applied optical fiber and the number of spans and the optimum estrangement amount can be indicated in a one-by-one corresponding relationship as seen in FIG. 21. Then, the relationship between the product of the transmission line dispersion coefficient and the number of spans and the optimum estrangement amount can be formulized using not only such a linear function expression as given as the expression (1) hereinabove but also a linear function expression $y1=(-A)x+(-B)$ wherein the polarities of the gradient A and the intercept B in the linear function expression are inversed.

In particular, if only variations of setting of a dispersion compensation amount regarding the pertaining optimum estrangement amount are evaluated by using an optimum estrangement amount using the linear function expression formulized in such a manner as just described, then setting of an optimum dispersion compensation amount can be searched readily.

Figure 31A:
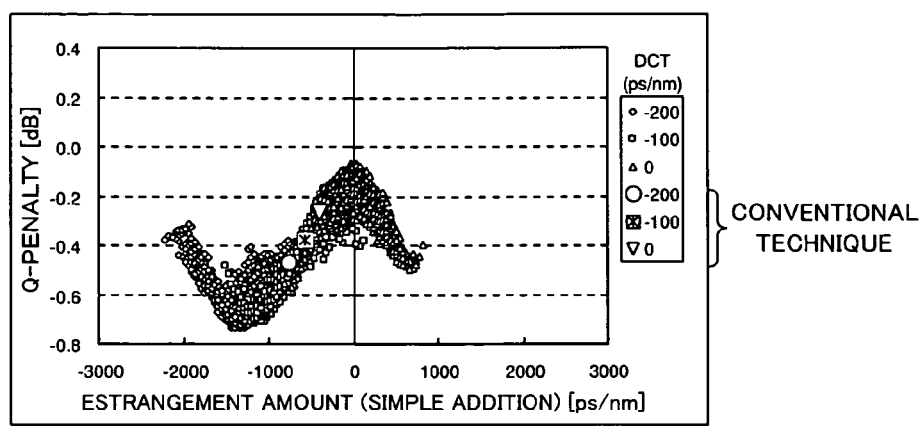
FIGS. 31(a) to 31(c) are diagrams each illustrating a relative positional relationship regarding measurement points where a conventional setting method for a chromatic dispersion compensation amount is adopted in the measurement point distributions illustrated in FIGS. 22 to 24, respectively.
Figure 31B:
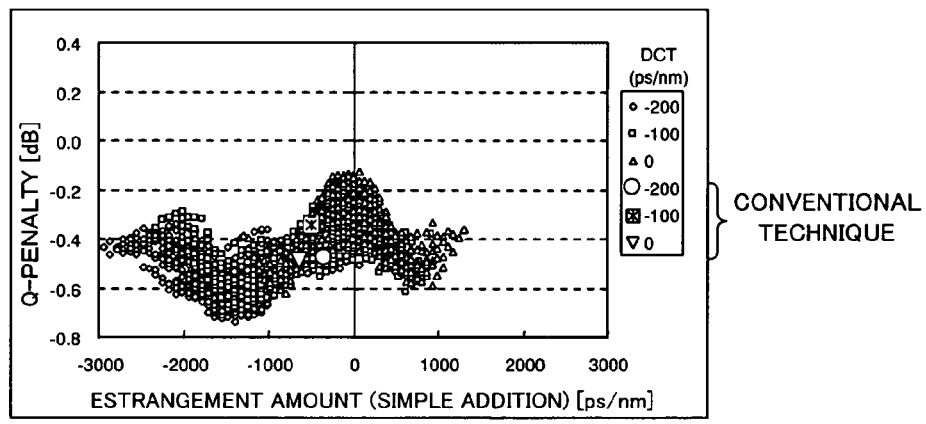
Figure 31C:
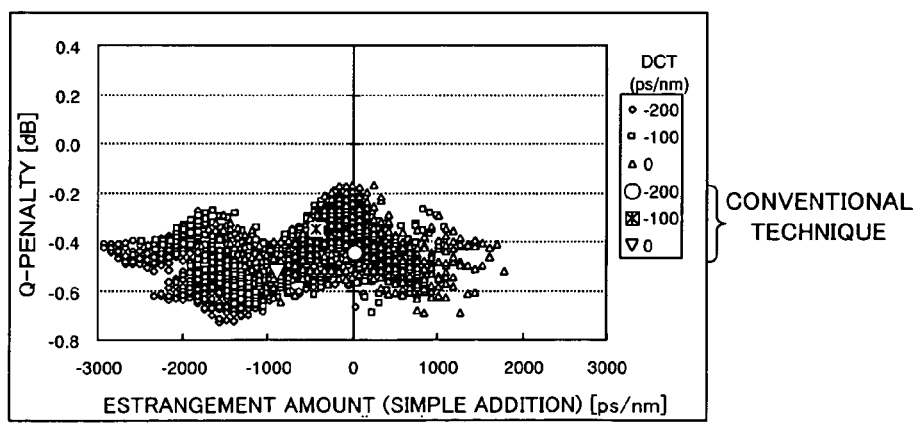
Figure 32A:
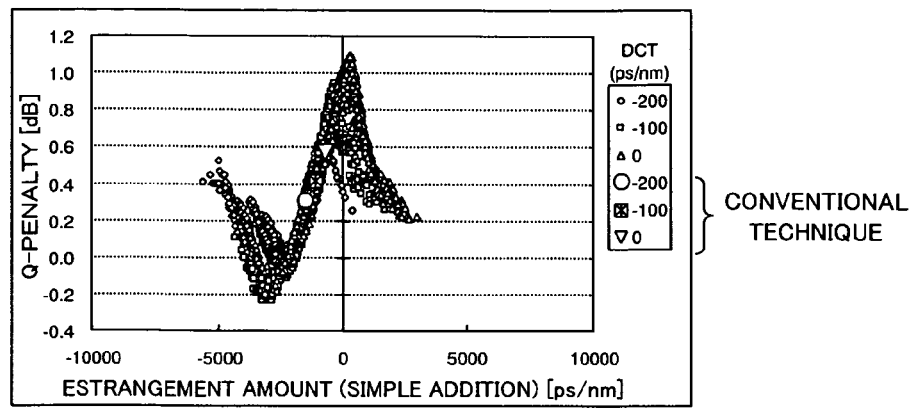
FIGS. 32(a) to 32(c) are views showing a relative positional relationship regarding a measurement point where a conventional setting method of a chromatic dispersion compensation amount is applied in the measurement point distributions shown in FIGS. 25 to 27, respectively.
Figure 32B:
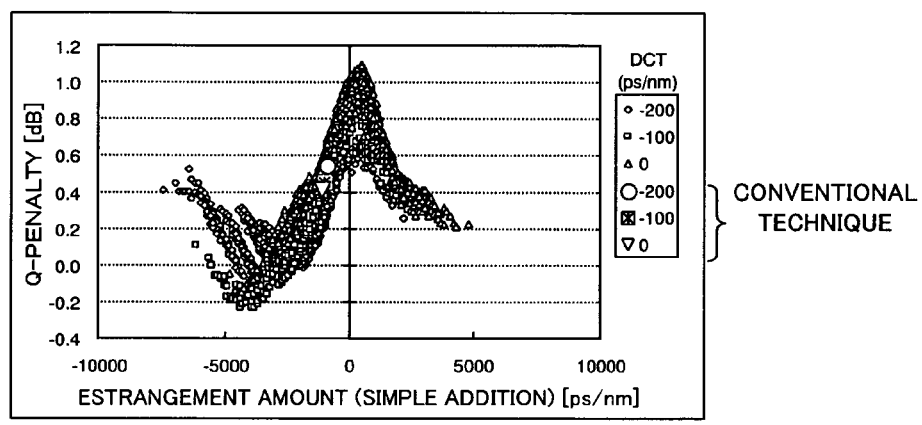
Figure 32C:
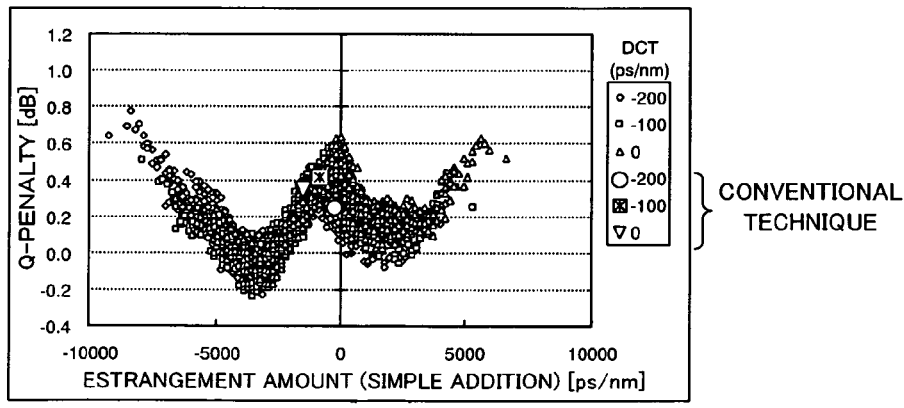

FIGS. 31(a) to 31(c) individually illustrate a relative positional relationship of measurement points where such a setting method of a chromatic dispersion compensation amount as disclosed in Patent Document 1 is adopted in the measurement point distributions illustrated in FIGS. 22 to 24 described above, respectively. Further, FIGS. 32(a) to 32(c) individually illustrate a relative positional relationship of measurement points where such a setting method of a chromatic dispersion compensation amount as disclosed in Patent Document 1 is adopted in the measurement point distributions illustrated in FIGS. 25 to 27 described above, respectively.

Also in this instance, in the figures mentioned above, a plot pattern "○" indicates a measurement point where the pre-dispersion compensation amount (refer to reference character 2b in FIG. 1) is set to −200 ps/nm and another plot pattern ["*" in "□"] indicates a measurement point where the pre-dispersion compensation amount is set to −100 ps/nm, and a further plot pattern "∇" indicates a measurement point where the pre-dispersion compensation amount is set to 0 ps/nm.

It can be recognized from the plot patterns "○", ["*" in "∇"], and "∇" in FIGS. 31(a) to 31(c) and 32(a) to 32(c) that, if only such a designing method of a dispersion compensation amount in a transmission span as examined when an optical signal of the NRZ modulation method is transmitted as disclosed in Patent Document 1 is used as it is when an optical signal of the DQPSK modulation method is transmitted, it is difficult to acquire satisfactory signal quality. In contrast, if an optimum estrangement amount is calculated in such a manner as described in the description of the present embodiment, then the calculated optimum estrangement amount can be used as a useful term when setting of an optimum dispersion compensation amount is searched. Therefore, searching in setting of an optimum dispersion compensation amount can be performed easily.

[b] Description of Second Embodiment

Figure 33:
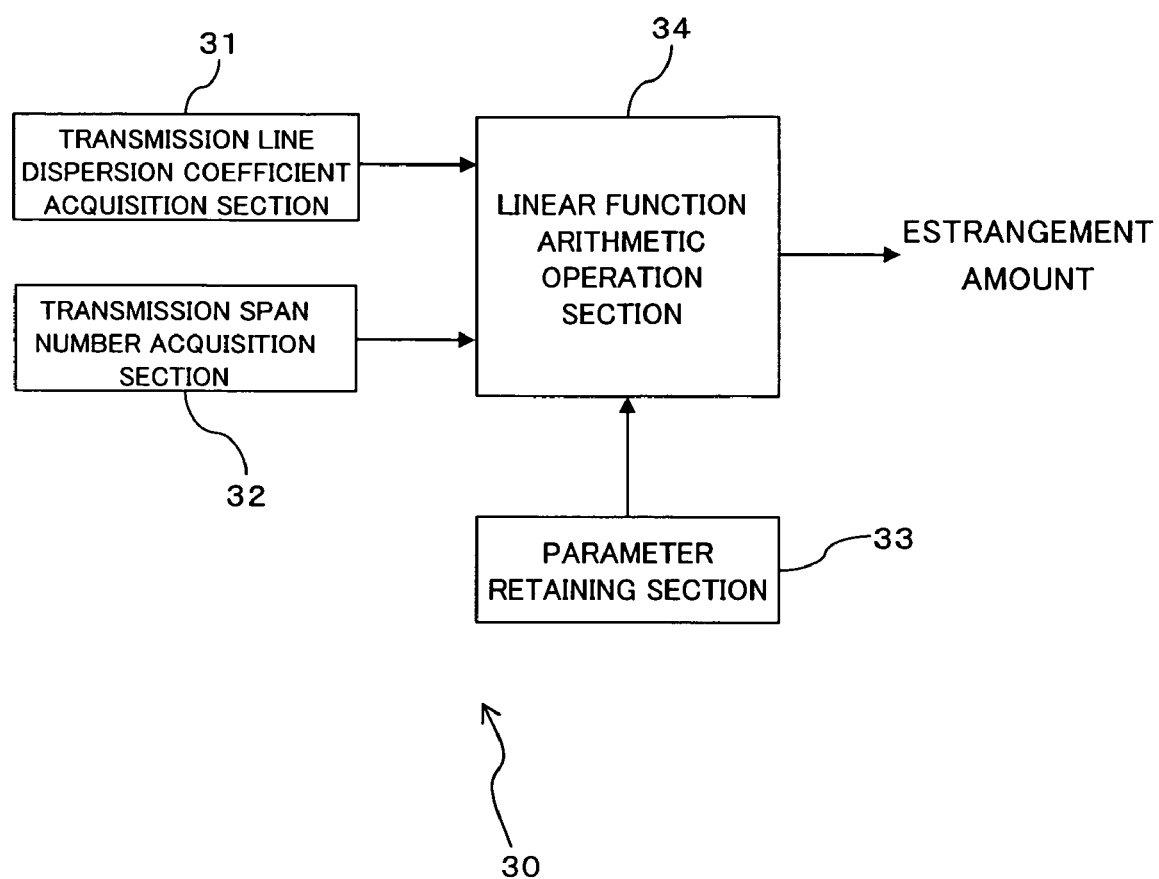
FIG. 33 is a block diagram showing a simulation equipments according to a second embodiment of the present invention.

FIG. 33 shows a simulation equipments according to a second embodiment of the present invention. Referring to FIG. 33, the simulation equipments 30 can output, in response to a transmission line dispersion coefficient and a number of transmission spans, an optimum estrangement amount in accordance with the linear function expression used in the first embodiment described above.

In particular, by the simulation equipments 30, when such an optical transmission system 1 which includes a transmitter 2, a receiver 3 and repeater 11 to 15 as shown in FIG. 1 is to be constructed, a simple sum total or an absolute value sum of residual dispersion amounts by a dispersion compensation function in any of the equipments 2, 3 and 11 to 15 can be obtained as an optimum estrangement amount with which optimum received signal quality can be obtained. In other words, with an estrangement amount obtained by the simulation equipments 30, effective orientation when allocation of a dispersion compensation amount is searched can be obtained.

The simulation equipments 30 shown in FIG. 33 can be formed particularly from an information processing equipments which includes a storage section and an arithmetic operation processing section and can arithmetically operate the linear function expression used in the first embodiment described above by program processing. However, the simulation equipments 30 functionally includes a transmission line dispersion coefficient acquisition section 31, a transmission span number acquisition section 32, a parameter retaining section 33, and a linear function arithmetic operation section 34.

The transmission line dispersion coefficient acquisition section 31 acquires a dispersion coefficient regarding the transmission line (refer to reference numeral 10 in FIG. 1) of an optical transmission system to be constructed. The transmission span number acquisition section (repeat number acquisition section) 32 acquires the number of repeaters (number of spans) for interconnecting adjacent ones of the equipments (refer to reference numerals 2, 11 to 15 and 3 in FIG. 1) which form the optical transmission system to be constructed.

The parameter retaining section 33 retains, as parameter information, a gradient and an intercept of the linear function used for arithmetic operation in the linear function arithmetic operation section 34 described below.

The linear function arithmetic operation section 34 performs arithmetic operation using a linear function similar to that used in the first embodiment described above wherein the product of the number of repeaters acquired by the transmission span number acquisition section 32 and the dispersion coefficient acquired by the transmission line dispersion coefficient acquisition section 31 is used as a variable x, and outputs, as an estrangement amount, the sum total of residual dispersion amount remaining after dispersion compensation by any of the equipments (refer to reference numerals 2, 11 to 15 and 3 in FIG. 1) or the sum total of absolute values of the residual dispersion amounts.

In particular, the sum total or the absolute value sum of residual dispersion amounts arithmetically operated by the linear function arithmetic operation section 34 can be calculated as a value with which good received signal quality can be achieved in response to the transmission line dispersion coefficient and the number of transmission spans with the gradient and the intercept retained in the parameter retaining section 33. Therefore, the value obtained by the linear function arithmetic operation section 34 can be used as a barometer value when a dispersion compensation amount is to be set in each of the equipments (refer to reference numeral 2, 11 to 15 and 3 in FIG. 1).

Accordingly, with the second embodiment of the present invention, the linear function arithmetic operation section 34 can calculate a value, with which good received signal quality can be achieved, as the sum total or the absolute value sum of residual dispersion amounts by simple arithmetic operation in response to a transmission line dispersion coefficient and the number of transmission spans. Therefore, in searching of setting of a dispersion compensation amount, influential orientation for obtaining setting for achieving good received signal quality can be obtained when compared with an alternative case wherein measurement and evaluation of received signal quality in random setting of a dispersion compensation amount are performed. Consequently, the load to development of an optical transmission system can be broadly decreased.

[c] Others

The present invention is not limited to the embodiments specifically described above, and variations and modifications can be made without departing from the scope of the present invention.

For example, while the object of processing in the embodiments described above is an optical signal for which differential phase shift keying, according to the present invention, the object of processing is not limited to this, but, for example, the object of processing may be an optical signal to which a different optical modulation method such as, for example, an NRZ modulation method is applied.

Further, in the optical transmission system 1 according to the first embodiment, a WDM optical signal may be transmitted from the transmitter 2.

Further, by the disclosure of the embodiments described above, those skilled in the art could fabricate the equipments of the present invention.

What is claimed is:

1. A chromatic dispersion compensation method for an optical transmission system which includes a transmitter for transmitting an optical signal, a receiver for receiving the optical signal, and a transmission line for interconnecting said transmitter and said receiver through at least one repeater and wherein a respective dispersion compensation section for compensating for a chromatic dispersion of said transmission line is provided in any of said transmitter, repeaters of said at least one repeater and said receiver, the method comprising:

determining a number of repeaters of said at least one repeater;

calculating a value to be set as a sum total of residual dispersion amounts remaining after dispersion compensation by each provided dispersion compensation section or as the sum total of absolute values of the residual dispersion amounts in response to the determined number of repeaters by arithmetically operating a linear function, wherein a product of the number of repeaters and a chromatic dispersion coefficient is used as a variable to calculate; and determining a dispersion compensation amount by each provided dispersion compensation section based on the calculated value to be set as the sum total of residual dispersion amounts or as the sum total of absolute values of the residual dispersion amounts.

2. The chromatic dispersion compensation method for an optical transmission system as claimed in claim 1, wherein the linear function expression is $y1=Ax+B$ or $y2=Ax+B$ where the variable x is a value calculated by multiplying the number of repeaters by a chromatic dispersion coefficient while A is a gradient and B is an intercept, and the sum total $y1$ of residual dispersion amounts remaining after the dispersion compensation by each provided dispersion compensation section or the sum $y2$ of absolute values of the residual dispersion amounts is calculated using the linear function expression.

3. The chromatic dispersion compensation method for an optical transmission system as claimed in claim 2, wherein the sum total $y1$ of residual dispersion amounts for determining the dispersion compensation amount by each provided dispersion compensation section is calculated using a linear function expression wherein the gradient A and the intercept B in the linear function expression $y1=Ax+B$ are assumed as values same as values when the sum $y2$ of absolute values of the residual dispersion amounts is represented or as values obtained by inverting the polarities of the individual values.

4. The chromatic dispersion compensation method for an optical transmission system as claimed in claim 2, wherein said transmitter transmits an optical signal modulated by differential phase shift keying, and, where the unit of the sum total $y1$ of residual dispersion amounts or the sum total $y2$ of absolute values of the residual dispersion amounts is ps/nm and the unit of the chromatic dispersion coefficient of said transmission line is ps/nm/km, the value of the gradient A in the linear function expression is set to 56 to 80 and the value of the intercept B is set to −170 to −70.

5. The chromatic dispersion compensation method for an optical transmission system as claimed in claim 2, wherein the gradient A and the intercept B of the linear function expression are set in response to a modulation method for an optical signal to be outputted from said transmitter and a type of an optical fiber which forms said transmission line.

6. The chromatic dispersion compensation method for an optical transmission system as claimed in claim 3, wherein the gradient A and the intercept B of the linear function expression are set in response to a modulation method for an optical signal to be outputted from said transmitter and a type of an optical fiber which forms said transmission line.

7. The chromatic dispersion compensation method for an optical transmission system as claimed in claim 1, wherein said transmitter transmits a WDM optical signal.

8. An optical transmission system, comprising:
a transmitter for transmitting an optical signal;
a receiver for receiving the optical signal;
a transmission line for interconnecting said transmitter and said receiver through at least one repeater; and
a dispersion compensation section provided in any of said transmitter, repeaters of said at least one repeater and said receiver for compensating for a chromatic dispersion of said transmission line;

a dispersion compensation amount by each provided dispersion compensation section being determined such that the sum total of residual dispersion amounts remaining after dispersion compensation by each provided dispersion compensation section or the sum total of absolute values of the residual dispersion amounts increases substantially in proportion to a product of the number of repeaters of said at least one repeater and a chromatic dispersion coefficient.

9. An apparatus for arithmetically operating a barometer value which is to be used, in an optical transmission system which includes a transmitter for transmitting an optical signal, a receiver for receiving the optical signal and a transmission line for interconnecting said transmitter and said receiver through at least one repeater, as a barometer for setting a dispersion compensation amount in each respective dispersion compensation section provided in any of said transmitter, repeaters of said at least one repeater and said receiver, comprising:

a repeater number acquisition section for acquiring the number of repeaters of said at least one repeater;
a transmission line dispersion coefficient acquisition section for acquiring a dispersion coefficient of said transmission line;
a linear function arithmetic operation section for performing arithmetic operation of a linear function wherein the product of the number of repeaters acquired by said repeater number acquisition section and the dispersion coefficient acquired by said transmission line dispersion coefficient acquisition section is used as a variable to calculate, as the barometer value, the sum total of residual dispersion amounts remaining after dispersion compensation by each provided dispersion compensation section or the sum total of absolute values of the residual dispersion amounts; and
a parameter retaining section for retaining a gradient and an intercept of the linear function to be used in the arithmetic operation by said linear function arithmetic operation section as parameter information.

10. A chromatic dispersion compensation method for an optical transmission system which includes a transmitter for transmitting an optical signal, a receiver for receiving the optical signal, and a transmission line for interconnecting said transmitter and said receiver through at least one repeater and wherein a respective dispersion compensation section for compensating for a chromatic dispersion of said transmission line is provided in any of said transmitter, repeaters of said at least one repeater and said receiver, the method comprising:

determining a number of repeaters of said at least one repeater;
calculating a value to be set as a sum total of residual dispersion amounts remaining after dispersion compensation by each provided dispersion compensation section or as the sum total of absolute values of the residual dispersion amounts in response to the determined number of repeaters by arithmetically operating a linear function; and
determining a dispersion compensation amount by each provided dispersion compensation section based on the calculated value to be set as the sum total of residual dispersion amounts or as the sum total of absolute values of the residual dispersion amounts, wherein the linear function expression is $y1=Ax+B$ or $y2=Ax+B$ where the variable x is a value calculated by multiplying the number of repeaters by a chromatic dispersion coefficient while A is a gradient and B is an intercept, and the sum total y1 of residual dispersion amounts remaining after the dispersion compensation by each provided dispersion compensation section or the sum y2 of absolute values of the residual dispersion amounts is calculated using the linear function expression.

11. The chromatic dispersion compensation method for an optical transmission system as claimed in claim 10, wherein the sum total y1 of residual dispersion amounts for determining the dispersion compensation amount by each provided dispersion compensation section is calculated using a linear function expression wherein the gradient A and the intercept B in the linear function expression $y1=Ax+B$ are assumed as values same as values when the sum y2 of absolute values of the residual dispersion amounts is represented or as values obtained by inverting the polarities of the individual values.

12. The chromatic dispersion compensation method for an optical transmission system as claimed in claim 10, wherein said transmitter transmits an optical signal modulated by differential phase shift keying, and, where the unit of the sum total y1 of residual dispersion amounts or the sum total y2 of absolute values of the residual dispersion amounts is ps/nm and the unit of the chromatic dispersion coefficient of said transmission line is ps/nm/km, the value of the gradient A in the linear function expression is set to 56 to 80 and the value of the intercept B is set to −170 to −70.

13. The chromatic dispersion compensation method for an optical transmission system as claimed in claim 10, wherein the gradient A and the intercept B of the linear function expression are set in response to a modulation method for an optical signal to be outputted from said transmitter and a type of an optical fiber which forms said transmission line.

14. The chromatic dispersion compensation method for an optical transmission system as claimed in claim 11, wherein the gradient A and the intercept B of the linear function expression are set in response to a modulation method for an optical signal to be outputted from said transmitter and a type of an optical fiber which forms said transmission line.

* * * * *